US011953865B2

(12) United States Patent
Risbeck et al.

(10) Patent No.: US 11,953,865 B2
(45) Date of Patent: Apr. 9, 2024

(54) HVAC CONTROLLER WITH PREDICTIVE COST OPTIMIZATION

(71) Applicant: Johnson Controls Technology Company, Auburn Hills, MI (US)

(72) Inventors: Michael J. Risbeck, Madison, WI (US); Robert D. Turney, Watertown, WI (US); Christos T. Maravelias, Middleton, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 240 days.

(21) Appl. No.: 16/719,865

(22) Filed: Dec. 18, 2019

(65) Prior Publication Data

US 2020/0125045 A1 Apr. 23, 2020

Related U.S. Application Data

(63) Continuation-in-part of application No. 14/694,633, filed on Apr. 23, 2015, now Pat. No. 10,761,547.

(51) Int. Cl.
*G05B 13/04* (2006.01)
*F24F 11/54* (2018.01)

(52) U.S. Cl.
CPC ............ *G05B 13/048* (2013.01); *F24F 11/54* (2018.01); *G05B 13/042* (2013.01)

(58) Field of Classification Search
CPC .. F24F 11/62; F24F 11/30; F24F 11/46; F24F 11/47; F24F 11/54; F24F 11/63;
(Continued)

(56) References Cited

U.S. PATENT DOCUMENTS 7,580,775 B2 8/2009 Kulyk et al.
7,894,943 B2 2/2011 Sloup et al.
(Continued)

FOREIGN PATENT DOCUMENTS

CA 2957726 A1 3/2016
CA 3043996 A1 2/2018
(Continued)

OTHER PUBLICATIONS

Albadi, M.H., El-Saadany, E.F.: Demand response in electricity markets: an overview. In: 2007 IEEE Power Engineering Society General Meeting, IEEE, pp. 1-5 (2007).
(Continued)

*Primary Examiner* — Santosh R Poudel
(74) *Attorney, Agent, or Firm* — Foley & Lardner LLP

(57) ABSTRACT

A controller for heating, ventilation, or air conditioning (HVAC) equipment including a processing circuit configured to perform a first optimization to generate a first set of control decisions for HVAC equipment including waterside HVAC equipment that consume resources from utility providers to generate a heated or chilled fluid and airside HVAC equipment that receive and use the fluid from the waterside HVAC equipment to heat or cool a supply of airflow for a building. The processing circuit is configured to perform a second optimization subject to a constraint based on a result of the first optimization to generate a second set of control decisions for the HVAC equipment and to combine the first and second sets to generate a combined set of control decisions for the HVAC equipment. The processing circuit is configured to operate the HVAC equipment in accordance with the combined set of control decisions.

18 Claims, 9 Drawing Sheets

(58) Field of Classification Search
CPC .... F24F 11/84; F24F 2110/10; F24F 2140/50;
F24F 2140/60; F24F 11/49; F24F 11/52;
F24F 11/58; F24F 11/61; F24F 11/65;
F24F 11/74; F24F 11/83; F24F 11/85;
F24F 2110/12; F24F 2110/20; F24F
2110/40; F24F 2130/10; F24F 2221/54;
F24F 3/001; F24F 5/0003; F24F 5/001;
F24F 5/0035
See application file for complete search history.

(56) References Cited

U.S. PATENT DOCUMENTS

| | | | |
|---|---|---|---|
| 7,894,946 | B2 | 2/2011 | Kulyk et al. |
| 8,527,108 | B2 | 9/2013 | Kulyk et al. |
| 8,527,109 | B2 | 9/2013 | Kulyk et al. |
| 8,600,561 | B1 | 12/2013 | Modi et al. |
| 8,903,554 | B2 | 12/2014 | Stagner |
| 8,918,223 | B2 | 12/2014 | Kulyk et al. |
| 9,080,789 | B2 | 7/2015 | Hamstra et al. |
| 9,110,647 | B2 | 8/2015 | Kulyk et al. |
| 9,429,923 | B2 | 8/2016 | Ward et al. |
| 9,447,985 | B2 | 9/2016 | Johnson |
| 9,703,339 | B2 | 7/2017 | Kulyk et al. |
| 10,139,877 | B2 | 11/2018 | Kulyk et al. |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 2003/0055798 | A1 | 3/2003 | Hittle et al. |
| 2007/0005191 | A1 | 1/2007 | Sloup et al. |
| 2008/0234869 | A1* | 9/2008 | Yonezawa ............... F24F 11/30 236/49.3 |
| 2008/0294291 | A1* | 11/2008 | Salsbury ................ F24F 11/62 700/277 |
| 2009/0171512 | A1* | 7/2009 | Duncan .................. F24F 11/30 62/157 |
| 2009/0171521 | A1 | 7/2009 | Moki et al. |
| 2010/0307171 | A1 | 12/2010 | Hamann et al. |
| 2011/0011595 | A1* | 1/2011 | Huang .................... E21B 43/00 703/10 |
| 2011/0066258 | A1 | 3/2011 | Torzhkov et al. |
| 2012/0232701 | A1 | 9/2012 | Carty et al. |
| 2012/0296480 | A1* | 11/2012 | Raman ............... G05D 23/1934 700/277 |
| 2012/0323637 | A1 | 12/2012 | Cushing et al. |
| 2013/0013121 | A1 | 1/2013 | Henze et al. |
| 2013/0101009 | A1 | 4/2013 | Huang et al. |
| 2013/0274940 | A1 | 10/2013 | Wei et al. |
| 2013/0345880 | A1 | 12/2013 | Asmus |
| 2014/0039844 | A1 | 2/2014 | Strelec et al. |
| 2014/0067088 | A1 | 3/2014 | Macek et al. |
| 2014/0128996 | A1 | 5/2014 | Sayyarrodsari et al. |
| 2014/0200868 | A1* | 7/2014 | Motto .................... G06F 30/13 703/2 |
| 2014/0229146 | A1 | 8/2014 | Gonzalez et al. |
| 2014/0249876 | A1 | 9/2014 | Wu et al. |
| 2014/0277760 | A1 | 9/2014 | Marik et al. |
| 2014/0303792 | A1 | 10/2014 | Tsuzaki et al. |
| 2015/0178421 | A1 | 6/2015 | Borrelli et al. |
| 2015/0178865 | A1 | 6/2015 | Anderson et al. |
| 2015/0253027 | A1 | 9/2015 | Lu et al. |
| 2015/0253030 | A1 | 9/2015 | Holub et al. |
| 2015/0316901 | A1 | 11/2015 | Wenzel et al. |
| 2015/0316902 | A1 | 11/2015 | Wenzel et al. |
| 2015/0316903 | A1 | 11/2015 | Asmus et al. |
| 2015/0316946 | A1 | 11/2015 | Wenzel et al. |
| 2016/0187896 | A1 | 6/2016 | Jones et al. |
| 2016/0227676 | A1 | 8/2016 | Zhou et al. |
| 2016/0313751 | A1 | 10/2016 | Risbeck et al. |
| 2018/0004172 | A1* | 1/2018 | Patel .................... G05B 15/02 |
| 2018/0113482 | A1* | 4/2018 | Vitullo .................. G06N 20/20 |
| 2018/0254109 | A1* | 9/2018 | Cheatham, III ........ G06F 30/20 |
| 2018/0300334 | A1* | 10/2018 | Saha .................... G06N 20/00 |
| 2019/0219293 | A1* | 7/2019 | Wenzel ................ G06Q 50/06 |
| 2020/0049394 | A1* | 2/2020 | Szewerenko .......... F25B 49/00 |

FOREIGN PATENT DOCUMENTS

| | | |
|---|---|---|
| CN | 102281220 A | 12/2011 |
| CN | 102331758 A | 1/2012 |
| CN | 102597639 A | 7/2012 |
| CN | 102812303 A | 12/2012 |
| CN | 103941591 A | 7/2014 |
| EP | 1 156 286 A2 | 11/2001 |
| EP | 3 186 687 A4 | 7/2017 |
| EP | 3 497 377 A1 | 6/2019 |
| WO | WO-2012/161804 A1 | 11/2012 |
| WO | WO-2013/130956 A1 | 9/2013 |
| WO | WO-2018067853 A1 * | 4/2018 ............ F25B 25/005 |

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 14 pages.

Diederik Kingma and Jimmy Ba. Adam: A Method for Stochastic Optimization. In International Conference on Learning Representations (ICLR), 2015, 15 pages.

Du, J., Park, J., Harjunkoski, I., Baldea, M .: A time scale-bridging approach for integrating production scheduling and process control. Comput. Chem. Eng. 79, 59-69 (2015).

ElBsat, M.N., Wenzel, M.J.: Load and electricity rates prediction for building wide optimization applications. In: 4th International High Performance Buildings Conference at Purdue, West Lafayette, IN (2016).

EPO Exam Report for Application No. 16165681.4-1927 dated Nov. 6, 2017, 3 pages.

Extended European Search Report for Application EP 16165681.4, dated Oct. 20, 2016, 5 pages.

Feng, J.D., Chuang, F., Borrelli, F., Bauman, F.: Model predictive control of radiant slab systems with evaporative cooling sources. Energy Build. 87, 199-210 (2015).

First Office Action on Chinese Patent Application No. 201610257004.7 dated Jul. 2, 2018. 11 pages.

Fisher, Marshall L. "The Lagrangian Relaxation Method for Solving Integer Programming Problems". Management Science, vol. 50, No. 12, Ten Most Influential Titles of "Management Science's First Fifty Years" (Dec. 2004), pp. 1861-1871.

George EP Box, Gwilym M Jenkins, Gregory C Reinsel, and Greta M Ljung. Time Series Analysis: Forecasting and Control. John Wiley & Sons, 2015, chapters 13-15. 82 pages.

Gupta, D., Maravelias, C.T., Wassick, J.M.: From rescheduling to online scheduling. Chem. Eng. Res. Des. 116, 83-97 (2016).

Gupta, D., Maravelias, C.T.: On deterministic online scheduling: major considerations, paradoxes and remedies. Comput. Chem. Eng. 94, 312-330 (2016).

Harjunkoski, I., Maravelias, C.T., Bongers, P., Castro, P.M., Engell, S., Grossmann, I.E., Hooker, J., Mendez, C., Sand, G., Wassick, J.: Scope for industrial applications of production scheduling models and solution methods. Comput. Chem. Eng. 62, 161-193 (2014).

Henze, G.P., Biffar, B., Kohn, D., Becker, M.P.: Optimal design and operation of a thermal storage system for a chilled water plant serving pharmaceutical buildings. Energy Build. 40(6), 1004-1019 (2008).

Henze, G.P., Felsmann, C., Knabe, G.: Evaluation of optimal control for active and passive building thermal storage. Int. J. Therm. Sci. 43(2), 173-183 (2004).

Henze, G.P.: Energy and cost minimal control of active and passive building thermal storage inventory. J. Sol. Energy Eng. 127(3), 343-351 (2005).

Jie Chen and Guoxiang Gu. Control-oriented System Identification: an H1 Approach, vol. 19. Wiley-Interscience, 2000, chapters 3 & 8, 38 pages.

(56) References Cited

OTHER PUBLICATIONS

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 12 pages.

K. J. Astrom. Optimal Control of Markov Decision Processes with Incomplete State Estimation. J. Math. Anal. Appl., 10:174-205, 1965. 32 pages.

Kapoor, K., Powell, K.M., Cole, W.J., Kim, U.S., Edgar, T.F.: Improved large-scale process cooling operation through energy optimization. Processes 1(3), 312-329 (2013).

Kelly et al., Are intelligent agents the key to optimizing building HVAC system performance. Aug. 10, 2012, Taylor & Francis, pp. 757-758.

Kelman and F. Borrelli. Bilinear Model Predictive Control of a HVAC System Using Sequential Quadratic Programming. In Proceedings of the 2011 IFAC World Congress, 2011, 6 pages.

Kondili, E., Pantelides, C., Sargent, R.: A general algorithm for short-term scheduling of batch operations-I MILP formulation. Comput. Chem. Eng. 17(2), 211-227 (1993).

Lee, T.-S., Liao, K.-Y., Lu, W.-C.: Evaluation of the suitability of empirically-based models for predicting energy performance of centrifugal water chillers with variable chilled water flow. Appl. Energy 93, 583-595 (2012).

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Li, Z., Floudas, C.A.: A comparative theoretical and computational study on robust counterpart optimization: III improving the quality of robust solutions. Ind. Eng. Chem. Res. 53(33), 13112-13124 (2014).

Li, Z., Ierapetritou, M.G.: Process scheduling under uncertainty: review and challenges. Comput. Chem. Eng. 32(4-5), 715-727 (2008).

Ma, J., Qin, J., Salsbury, T., Xu, P.: Demand reduction in building energy systems based on economic model predictive control. Chem. Eng. Sci. 67(1), 92-100 (2012).

Ma, Y., Borrelli, F., Hencey, B., Coffey, B., Bengea, S.C., Haves, P.: Model predictive control for the operation of building cooling systems. IEEE Control Syst. Technol. 20(3), 796-803 (2012).

Ma, Y., Matusko, J., Borrell, F.: Stochastic model predictive control for building HVAC systems: complexity and conservatism. IEEE Trans. Control Syst. Technol. 23(1), 101-116 (2015).

Maravelias, C.T.: General framework and modeling approach classification for chemical production scheduling. AIChE J. 58(6), 1812-1828 (2012.

Mendez, C.A., Cerda, J., Grossmann, I.E., Harjunkoski, I., Fahl, M.: State-of-the-art review of optimization methods for short-term scheduling of batch processes. Comput.Chem. Eng. 30(6-7), 913-946 (2006).

Mendez, C.A., Cerda, J.: An milp framework for batch reactive scheduling with limited discrete resources. Comput. Chem. Eng. 28(6-7), 1059-1068 (2004).

Mendoza-Serrano, D.I., Chmielewski, D.J.: HVAC control using infinite-horizon economic MPC. In: IEEE 51st Annual Conference on Decision and Control (CDC), pp. 6963-6968 (2012).

Moritz Hardt, Tengyu Ma, and Benjamin Recht. Gradient Descent Learns Linear Dynamical Systems. arXiv preprint arXiv:1609.05191, 2016, 44 pages.

Nevena et al. Data center cooling using model-predictive control, 10 pages. 2018.

Nie, Y., Biegler, L.T., Villa, C.M., Wassick, J.M.: Discrete time formulation for the integration of scheduling and dynamic optimization. Ind. Eng. Chem. Res. 54(16), 4303-4315 (2015).

Observation Report on European Patent Application No. 16165681.4 dated Oct. 5, 2018. 6 pages.

Office Action on Chinese Application No. 201610257004.7 dated Jul. 2, 2018. 11 pages.

Office Action on EP Application No. 16165681.4 dated Jul. 23, 2019. 7 pages.

Oldewurtel, F., Parisio, A., Jones, C.N., Gyalistras, D., Gwerder, M., Stauch, V., Lehmann, B., Morari, M.: Use of model predictive control and weather forecasts for energy efficient building climate control. Energy Build. 45, 15-27 (2012).

Pantelides, C.C.: Unified frameworks for optimal process planning and scheduling. In: Proceedings on the Second Conference on Foundations of Computer Aided Operations, pp. 253-274 (1994).

Patel, N.N.R., Risbeck, M.J., Rawlings, J.B., Wenzel, M.M.J., Turney, R.D.: Distributed economic model predictive control for large-scale building temperature regulation. In: American Control Conference, Boston, MA, pp. 895-900 (2016).

Powell, K.M., Cole, W.J., Ekarika, U.F., Edgar, T.F.: Optimal chiller loading in a district cooling system with thermal energy storage. Energy 50, 445-453 (2013).

Rawlings, J., Patel, N., Risbeck, M., Maravelias, C., Wenzel, M., Turney, R.: Economic MPC and real-time decision making with application to large-scale hvac energy systems. Comput. Chem. Eng. 114, 89-98 (2017).

Rawlings, J.B., Mayne, D.Q., Diehl, M.M.: Model Predictive Control: Theory, Computation and Design. Nob Hill Publishing, Madison (2017).

Risbeck, M.J., Maravellas, C.T., Rawlings, J.B., Turney, R.D.: A mixed-integer linear programming model for real-time cost optimization of building heating, ventilation, and air conditioning equipment. Energy Build. 142, 220-235 (2017).

Risbeck, Michael J., Maravelias, Christos T., Rawlings James B., Turney, Robert D. "Mixed-integer optimization methods for online scheduling in large-scale HVAC systems". Springer-Verlag GmbH Germany, part of Springer Nature 2019. Received Dec. 15, 2017/ Accepted Dec. 29, 2018. (Published online Jan. 23, 2019) https://doi.org/10.1007/s11590-018-01383-9.

Robert Weismantel, "Mixed Integer Optimization", ETH Zurich, pp. 1-3 (Year: 2019).

Second Chinese Office Action for Application No. CN 201610257004.7 dated Jan. 24, 2019, 11 pages.

Second Office Action on Chinese Application No. 201610257004.7 dated Jan. 24, 2019. 11 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Shi, H., You, F.: A computational framework and solution algorithms for two-stage adaptive robust scheduling of batch manufacturing processes under uncertainty. AIChE J. 62(3), 687-703 (2016).

Sourbron, Maarten. Dynamic Thermal Behaviour of Buildings with Concrete Core Activation. Sep. 2012. 407 pages.

Third Chinese Office Action for Application No. CN 201610257004.7 dated Aug. 14, 2019, 10 pages.

Touretzky, C.R., Baldea, M.: A hierarchical scheduling and control strategy for thermal energy storage systems. Energy Build. 110, 94-107 (2016).

Touretzky, C.R., Baldea, M.: Integrating scheduling and control for economic MPC of buildings with energy storage. J. Process Control 24(8), 1292-1300 (2014).

Touretzky, C.R., Harjunkoski, I., Baldea, M.: Dynamic models and fault diagnosis-based triggers for closed-loop scheduling. AIChE J. 63(6), 1959-1973 (2017).

Velez, S., Maravelias, C.T.: Reformulations and branching methods for mixed-integer programming chemical production scheduling models. Ind. Eng. Chem. Res. 52(10), 3832-3841 (2013).

Verhelst, et al. Study of the optimal control problem formulation for modulating air-to-water heat pumps connected to a residential floor heating system. Feb. 2012. 11 pages.

Vielma, J.P., Ahmed, S., Nemhauser, G.: Mixed-integer models for nonseparable piecewise-linear optimization: unifying framework and extensions. Oper. Res. 58(2), 303-315 (2010).

Vin, J.P., Ierapetritou, M.G.: A new approach for efficient rescheduling of multiproduct batch plants. Ind. Eng. Chem. Res. 39(11), 4228-4238 (2000).

(56) References Cited

OTHER PUBLICATIONS

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 21 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012. 8 pages.

Zavala, V.M., Constantinescu, E.M., Krause,T., Anitescu, M.: On-line economic optimization of energy systems using weather forecast information. J. Process Control 19(10), 1725-1736 (2009).

Office Action on EP 16165681.4, dated May 27, 2020.

Ward et al., "Beyond Comfort—Managing the Impact of HVAC Control on the Outside World," Proceedings of Conference: Air Conditioning and the Low Carbon Cooling Challenge, Cumberland Lodge, Windsor, UK, London: Network for Comfort and Energy Use in Buildings, http://nceub.org.uk, Jul. 27-29, 2008, 15 pages.

Office Action on EP 16165681.4, dated Aug. 31, 2021, 8 pages.

Clara Verhelst; Model Predictive Control of Ground Coupled Heat Pump Systems for Office Buildings. Apr. 2012; 316 pages.

M. Mossolly et al.; Optimal Control Strategy for a Multi-Zone Air Conditioning System Using Genetic Algorithm. Jan. 2009; 10 Pages.

Nassif et al., "Optimization of HVAC Control System Strategy Using Two-Objective Genetic Algorithm," Intl Journal of HVAC&R Research, 11(3):459-486 (2005).

Third party observation report on EP Application No. 16165681.4 dated Jan. 15, 2020.

Office Action on EP 16165681.4, dated Apr. 6, 2021, 7 pages.

Wang et al., "Model-based optimal control of VAV air conditioning system using genetic algorithm," Building and Environment, 2000, vol. 35, pp. 471-487.

Office Action CN 201610257004.7, dated Mar. 16, 2020, 19 pages with English translation.

Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.

(56) References Cited

OTHER PUBLICATIONS com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Extended EP Search Report on EP Appl. Ser. No. 22 17 7772 dated Sep. 26, 2022 (11 pages).
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., "Optimal Control of Building HVAC&R Systems Using Complete Simulation-Based Sequential Quadratic Programming (CSB-SQP)", Building and Environment, May 2005, vol. 40, No. 5 (pp. 657-669).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).

* cited by examiner

HVAC CONTROLLER WITH PREDICTIVE COST OPTIMIZATION

CROSS-REFERENCE TO RELATED PATENT APPLICATION

This application is a continuation-in-part of U.S. patent application Ser. No. 14/694,633, filed Apr. 23, 2015, the entire disclosure of which is incorporated by reference herein.

BACKGROUND

The present disclosure relates generally to a heating, ventilation, or air conditioning (HVAC) system and more particularly to an HVAC system that that uses optimizations to operate.

Maintaining occupant comfort in a building requires building equipment (e.g., HVAC equipment) to be operated to affect environmental conditions within the building. In typical systems, HVAC systems may operate on simplistic control algorithms (e.g., running based on an unchanging value) or may require users to manually adjust operation for any desired changes. Said approaches to controlling environmental conditions can result in higher costs and can waste occupants' time and energy.

SUMMARY

One implementation of the present disclosure is a controller for heating, ventilation, or air conditioning (HVAC) equipment, according to some embodiments. The controller includes a processing circuit, according to some embodiments. The processing circuit is configured to perform a first optimization to generate a first set of control decisions at time steps for HVAC equipment including waterside HVAC equipment that consume one or more resources from utility providers to generate a heated or chilled fluid and airside HVAC equipment that receive the heated or chilled fluid from the waterside HVAC equipment and use the heated or chilled fluid to heat or cool a supply of airflow for a building, according to some embodiments. The processing circuit is configured to perform a second optimization subject to a constraint based on a result of the first optimization to generate a second set of control decisions for the HVAC equipment, according to some embodiments. The processing circuit is configured to combine the first set of control decisions and the second set of control decisions to generate a combined set of control decisions for the HVAC equipment, according to some embodiments. The second set of control decisions at least partially override the first set of control decisions in the combined set of control decisions, according to some embodiments. The processing circuit is configured to operate the HVAC equipment in accordance with the combined set of control decisions, according to some embodiments.

In some embodiments, performing the first optimization includes decomposing a combined optimization problem for the waterside HVAC equipment and the airside HVAC equipment into a waterside dual subproblem for the waterside HVAC equipment and an airside dual subproblem for the airside HVAC equipment. Performing the first optimization includes solving both the waterside dual subproblem and the airside dual subproblem independently, according to some embodiments.

In some embodiments, the constraint is a first predicted airside demand resulting from solving the airside dual subproblem. The second optimization includes a primal waterside optimization that is performed subject to the constraint, according to some embodiments. The second set of control decisions are generated by performing the primal waterside optimization and override a portion of the first set of control decisions generated by solving the waterside dual subproblem, according to some embodiments.

In some embodiments, the processing circuit is configured to determine an initial estimate of a multiplier for resource supply to the airside HVAC equipment. The airside dual subproblem and the waterside dual subproblem are solved with respect to the initial estimate, according to some embodiments. The processing circuit is configured to update the initial estimate of the multiplier based on a difference between a first predicted airside demand resulting from solving the airside dual subproblem and a second predicted airside demand resulting from solving the waterside dual subproblem, according to some embodiments.

In some embodiments, the first optimization includes an integrated waterside and airside optimization that generates control decisions for both the waterside HVAC equipment and the airside HVAC equipment using a thermal model of the building and a simplified resource consumption model for the waterside HVAC equipment.

In some embodiments, the constraint is a predicted airside demand resulting from the integrated waterside and airside optimization. The second optimization includes a primal waterside optimization performed subject to a second constraint on the predicted airside demand, according to some embodiments. The second set of control decisions are for the waterside HVAC equipment and override a portion of the first set of control decisions that apply to the waterside HVAC equipment, according to some embodiments.

In some embodiments, the processing circuit further configured to generate the simplified resource consumption model for the waterside HVAC equipment by performing a waterside optimizations to determine amounts of resource consumption of the waterside HVAC equipment required to serve different combinations of airside loads.

In some embodiments, performing the first optimization includes using a simplified surrogate model of the waterside HVAC equipment and the airside HVAC equipment to generate the first set of control decisions at the time steps within a first prediction horizon and to predict a state of the HVAC equipment or a state of the building at one or more of the time steps within the first prediction horizon.

In some embodiments, the constraint is based on the predicted state of the HVAC equipment or the predicted state of the building at the one or more of the time steps within the first prediction horizon. The second optimization includes using a full model of the waterside HVAC equipment and the airside HVAC equipment to generate the second set of control decisions at time steps within a second prediction horizon, according to some embodiments. The second prediction horizon is shorter than the first prediction horizon, according to some embodiments. The second optimization is performed subject to the constraint, according to some embodiments. The simplified surrogate model includes one or more simplifications of the full model, according to some embodiments.

In some embodiments, the simplified surrogate model includes one or more simplifications of the full model. The one or more simplifications include at least one of removing at least one constraint of the full model, increasing a length of the time steps within the first prediction horizon, combining zones of the building into a single aggregate zone, or removing at least one variable of the full model.

Another implementation of the present disclosure is a method for operating heating, ventilation, or air conditioning (HVAC) equipment, according to some embodiments. The method includes performing a first optimization to generate a first set of control decisions at time steps for HVAC equipment including waterside HVAC equipment that consume one or more resources from utility providers to generate a heated or chilled fluid and airside HVAC equipment that receive the heated or chilled fluid from the waterside HVAC equipment and use the heated or chilled fluid to heat or cool a supply of airflow for a building, according to some embodiments. The method includes performing a second optimization subject to a constraint based on a result of the first optimization to generate a second set of control decisions for the HVAC equipment, according to some embodiments. The method includes combining the first set of control decisions and the second set of control decisions to generate a combined set of control decisions for the HVAC equipment, according to some embodiments. The second set of control decisions at least partially overrides the first set of control decisions in the combined set of control decisions, according to some embodiments. The method includes operating the HVAC equipment in accordance with the combined set of control decisions, according to some embodiments.

In some embodiments, performing the first optimization includes decomposing a combined optimization problem for the waterside HVAC equipment and the airside HVAC equipment into a waterside dual subproblem for the waterside HVAC equipment and an airside dual subproblem for the airside HVAC equipment. Performing the first optimization includes solving both the waterside dual subproblem and the airside dual subproblem independently, according to some embodiments.

In some embodiments, the constraint is a first predicted airside demand resulting from solving the airside dual subproblem. The second optimization includes a primal waterside optimization that is performed subject to the constraint, according to some embodiments. The second set of control decisions are generated by performing the primal waterside optimization and override a portion of the first set of control decisions generated by solving the waterside dual subproblem, according to some embodiments.

In some embodiments, the method includes determining an initial estimate of a multiplier for resource supply to the airside HVAC equipment. The airside dual subproblem and the waterside dual subproblem are solved with respect to the initial estimate, according to some embodiments. The method includes updating the initial estimate of the multiplier based on a difference between a first predicted airside demand resulting from solving the airside dual subproblem and a second predicted airside demand resulting from solving the waterside dual subproblem, according to some embodiments.

In some embodiments, the first optimization includes an integrated waterside and airside optimization that generates control decisions for both the waterside HVAC equipment and the airside HVAC equipment using a thermal model of the building and a simplified resource consumption model for the waterside HVAC equipment.

In some embodiments, the constraint is a first predicted airside demand resulting from solving the airside dual subproblem. The second optimization includes a primal waterside optimization that is performed subject to the constraint, according to some embodiments. The second set of control decisions are generated by performing the primal waterside optimization and override a portion of the first set of control decisions generated by solving the waterside dual subproblem, according to some embodiments.

In some embodiments, the method includes generating the simplified resource consumption model for the waterside HVAC equipment by performing waterside optimizations to determine amounts of resource consumption of the waterside HVAC equipment required to serve different combinations of airside loads.

In some embodiments, performing the first optimization includes using a simplified surrogate model of the waterside HVAC equipment and the airside HVAC equipment to generate the first set of control decisions at the time steps within a first prediction horizon and to predict a state of the HVAC equipment or a state of the building at one or more of the time steps within the first prediction horizon.

In some embodiments, the constraint is based on the predicted state of the HVAC equipment or the predicted state of the building at the one or more of the time steps within the first prediction horizon. The second optimization includes using a full model of the waterside HVAC equipment and the airside HVAC equipment to generate the second set of control decisions at time steps within a second prediction horizon, according to some embodiments. The second prediction horizon is shorter than the first prediction horizon, according to some embodiments. The second optimization is performed subject to the constraint, according to some embodiments. The simplified surrogate model includes one or more simplifications of the full model, according to some embodiments.

In some embodiments, the simplified surrogate model includes one or more simplifications of the full model. The one or more simplifications include at least one of removing at least one constraint of the full model, increasing a length of the time steps within the first prediction horizon, combining zones of the building into a single aggregate zone, or removing at least one variable of the full model.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
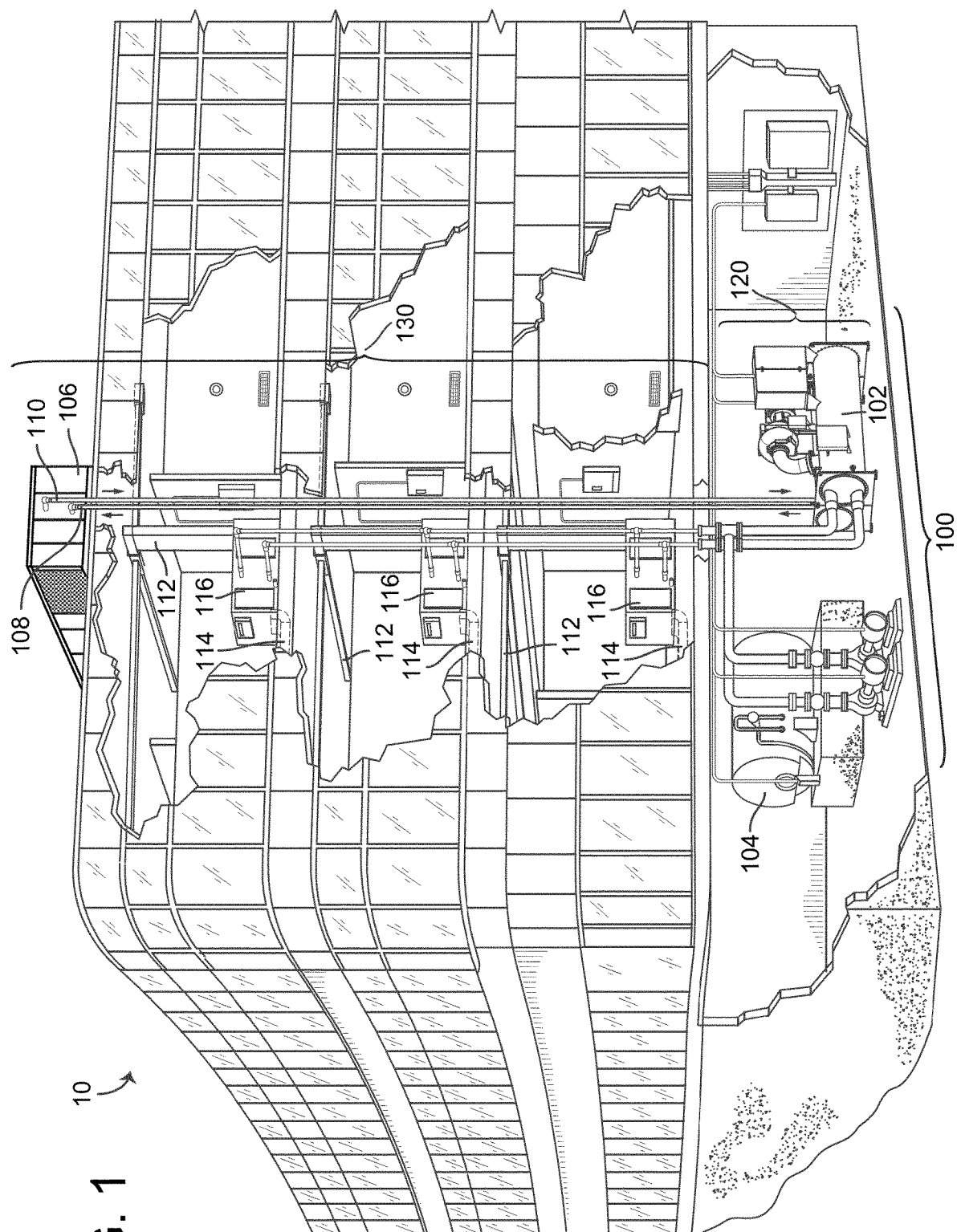
FIG. 1 is a drawing of a building equipped with a HVAC system that includes an airside system and a waterside system within the building, according to some embodiments.

Referring generally to the FIGURES, systems and methods for predictive cost optimization and components thereof are shown, according to various exemplary embodiments. The systems and methods described herein may be used to optimize the performance of a building heating, ventilating, or air conditioning (HVAC) system that includes both a waterside system and an airside system. In some embodiments, the waterside system consumes resources from utility providers (e.g., electricity, natural gas, water, etc.) to produce a heated or chilled fluid. The airside system can use the heated or chilled fluid to heat or cool a supply airflow provided to the building. In some embodiments, both the airside system and waterside system are located within the building. In some embodiments, the waterside system may be implemented as a central plant and may be separate from the building.

An HVAC control system can monitor and control both the airside system and the waterside system. The HVAC control system can include an HVAC controller which performs an integrated airside/waterside optimization process to simultaneously determine control outputs for both the airside system and the waterside system. The HVAC controller can be configured to generate operating schedules for building equipment by performing a cost optimization. The cost optimization may account for various factors such as demand charges, ambient conditions, forecasts of electricity prices, how building equipment affects the building, etc. As a result of the optimization, an operating schedule for the building equipment can be generated that optimizes (e.g., minimizes) costs and maintains comfortable conditions for occupants in the building.

The HVAC controller described herein may receive various data inputs including, for example, weather forecasts from a weather service, utility rates from utility providers, equipment performance curves defining the capabilities and performance characteristics of the HVAC equipment, building conditions from various sensors located within the building, and/or equipment states from the waterside system and the airside system. The HVAC controller may use the various data inputs to formulate an optimization problem and solve the optimization problem to determine an optimal set of control outputs the waterside system and the airside system. Advantageously, the HVAC controller may be capable of using both two-dimensional performance curves and three-dimensional (or greater) performance curves in a multidimensional optimization of equipment profiles.

As used herein, the term "optimization problem" may refer to any mathematical program or optimization that determines optimal values for a set of control outputs. An optimization problem generally includes variables to be optimized (e.g., equipment on/off states, operating setpoints, etc.) and may include a formulation of an objective function (e.g., a cost function to be minimized), constraints on the optimization process (e.g., acceptable temperature ranges for the building, device capacities, etc.), and/or parameters used in the objective function. Some or all of these components may be used to solve the integrated airside/waterside optimization problem and are described in greater detail below.

As referred to herein, an optimization (e.g., a cost optimization) can generate a solution to a particular optimization problem. It should be appreciated that performing the optimization may or may not generate an ideal solution (i.e., a perfect solution). Rather, the optimization can generate an optimal solution that can refer to a best solution determined by performing the optimization. In other words, the optimal solution can refer to a best available solution resulting from performing the optimization which may or may not be the same as an ideal solution (e.g., a solution that reduces cost to a lowest possible amount).

Large-scale heating, ventilation, and air conditioning (HVAC) plants can consume significant amounts of energy and may inherently operate in a time-varying fashion. As a result, these systems may be subject to both time-varying electricity prices and peak demand charges (e.g., based on the maximum instantaneous rate of electricity consumption over a given period). To reduce an amount of high-cost electricity purchased and to lower peak demand, HVAC systems can employ various forms of thermal energy storage (TES) to temporally decouple utility consumption from heating/cooling demand. In some embodiments, TES is categorized as either passive (e.g., storing energy in the thermal mass of buildings by pre-cooling or pre-heating) or active (e.g., storing energy in fluids or phase-change materials in insulated storage tanks). Optimal cost reduction can be achieved by utilizing both forms in the optimization performed by the HVAC controller. Further, irrespective of any particular utility pricing structure, significant increases in energy efficiency can be achieved by choosing the optimal combination of equipment to use to meet a given heating or cooling load.

To realize potential cost reductions and efficiency gains, various optimization-based approaches can be employed by the HVAC controller. As described in greater detail below, the HVAC system considered by the HVAC controller can be considered to include two separate subsystems. First, the HVAC system can include an airside system, which can include an air space and thermal mass of one or more buildings. The HVAC system can also include a waterside system, which may include chillers, boilers, and/or other pieces of equipment used to meet the heating and cooling demand of the airside system. It should be appreciated that the HVAC system may include other systems other than and/or in addition to the airside and waterside systems.

To utilize passive storage, some optimization strategies may employ model predictive control (MPC) applied to the airside system, which can optimize a future temperature trajectory of a building using a dynamic model for temperature evolution. For active storage, similar approaches can be employed but with a model for the dynamics of storage tanks. These approaches may not consider the problem of waterside equipment selection, which can be addressed as a separate static optimization problem. However, because central plant equipment can be very large, it may be desirable to enforce dwell times to avoid rapid switching. Dwell times can refer to an amount of time building equipment may remain in a particular state (e.g., on or off) before being allowed to switch to a different state. For example, a dwell time of 10 minutes may indicate a building device may be required to be on for a minimum of 10 minutes before the building device can be switched off. Thus, determining a feasible schedule can require scheduling of equipment use over multiple time periods. In this case, an optimization problem optimized by the HVAC controller can depend on forecasts of electricity prices, ambient conditions, auxiliary cooling demand, etc., which may not be completely accurate. Therefore, optimal performance may require an online solution to the scheduling problem to account for updated forecasts.

Two common model forms that can be utilized by the HVAC controller can include a state-task network (STN) and a resource-task network (RTN), both of which can model production environments using abstract materials or resources that are processed to produce other materials. Said models can be based on a discrete representation of time, and their performance is generally at least as good as continuous-time formulations and can be improved via various reformulations and augmentations.

As used herein, term "scheduling" can refer to generation of a single plan or schedule over a finite horizon. However, a single schedule may not be sufficient in practical applications. Due to process upsets, changes to demand, etc., a schedule can quickly become suboptimal, and a new schedule may need to be generated by the HVAC controller when a current schedule is exhausted. Two approaches for the rescheduling problem can include making a small set of modifications to the existing schedule to restore profitability, or to simply re-optimize the full schedule starting from a current time step. In either case, rescheduling may be performed sparingly (e.g., after a triggering event such as new equipment being installed in the building). Performing rescheduling sparingly can degrade performance, as a given schedule may become "stale" by failing to consider future time points.

To avoid using stale schedules to operate building equipment (e.g., equipment of the airside and/or waterside systems), the HVAC controller can perform closed-loop scheduling as opposed to generating single schedules as described above. Closed-loop scheduling can include computing a new optimal schedule at each time step regardless of any intervening event. After making a first set of unit allocations, a plant may be allowed to evolve for a fixed amount of time. After the fixed amount of time, the scheduling horizon can be advanced, and the process can be repeated to implicitly account for any changed process conditions or demands. This framework may be referred to herein as a "rolling-horizon" or a "moving-horizon." The individual optimal schedules can be referred to as the "open-loop" solutions, while the resulting schedule actually experienced by the system can be referred to as the "closed-loop" solution. Selection of the model time step and rescheduling frequency may depend on underlying system characteristics as well as computational tractability. The model time step should be chosen by the HVAC controller such that the time step is small enough to capture relevant dynamics of the system (e.g., thermal dynamics). In the case of HVAC central plants, the main considerations may be, for example, how often equipment can be switched on and off, as well as how frequently electricity prices change or demand forecasts can be updated.

Rapid rescheduling performed by the HVAC controller can lead to better closed-loop performance (i.e., performance of the implemented schedule). Further, costs can be reduced if rescheduling is performed at each time step. Thus, rescheduling should occur as often as is computationally tractable if costs are desired to be reduced. Computing schedules at each time step may lead to a more volatile plan, but proper tuning and a sufficiently long horizon can minimize these effects. For example, in HVAC central plants, dwell times can be added to prevent rapid equipment switching. Of course, closed-loop scheduling may require that optimal schedules can be computed in real-time, and thus it is important that the scheduling model captures all of the relevant decisions without becoming computationally burdensome. To select the optimal prediction horizon, the selection may depend on the relevant system timescales and should generally capture one or more of the natural periodic cycles of the system. In some embodiments, longer horizons are desirable, but in the absence of accurate forecasts, longer horizons may actually hurt closed-loop performance. Thus, optimal time steps and horizons can vary significantly by system and may require simulation to be accurately determined. Other aspects, features, and advantages of the present disclosure are described in detail in the paragraphs that follow.

Building and HVAC System

Referring specifically to FIG. 1, a perspective view of a building 10 is shown, according to an exemplary embodiment. Building 10 is serviced by a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or cooled fluid to an air handling unit of airside system 130. Airside system 130 may use the heated or cooled fluid to heat or cool an airflow provided to building 10. An exemplary waterside system and airside system are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant. The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements which can be operated to control an amount of the supply airflow provided to individual zones of building 10. In other embodiments, airside system 130 delivers the supply airflow into one or more zones of building 10 (e.g., via supply ducts 112) without requiring intermediate VAV units 116 or other flow control elements. AHU 106 may include various sensors (e.g., temperature sensors, pressure sensors, etc.) configured to measure attributes of the supply airflow. AHU 106 may also receive input from sensors located within the building zone and may adjust the flow rate and/or temperature of the supply airflow through AHU 106 to achieve setpoint conditions for the building zone.

Figure 2:
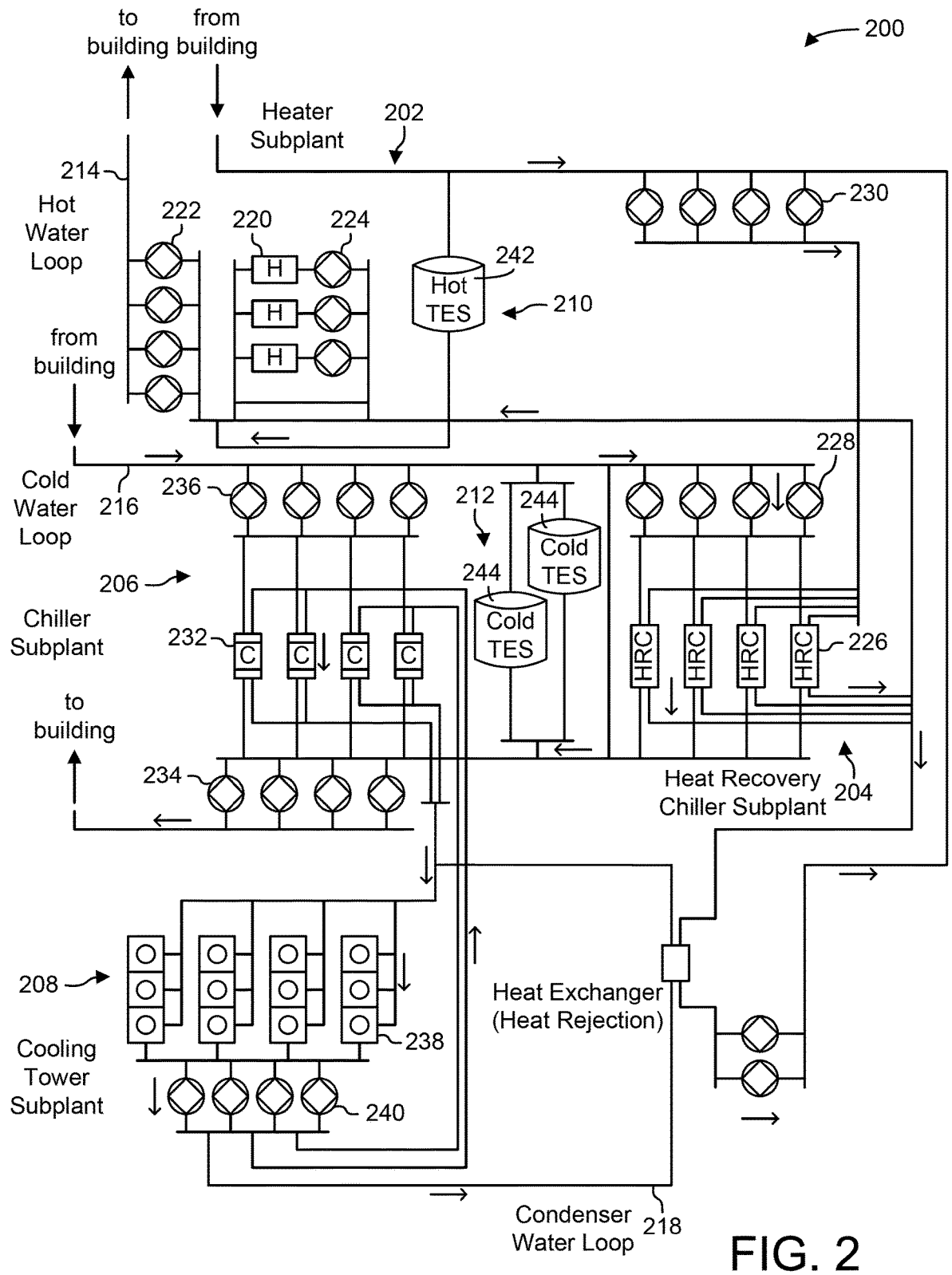
FIG. 2 is a block diagram of another waterside system (e.g., a central plant) that may be used as an alternative to the waterside system of FIG. 1 to provide a heated or chilled fluid to the building, according to some embodiments.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
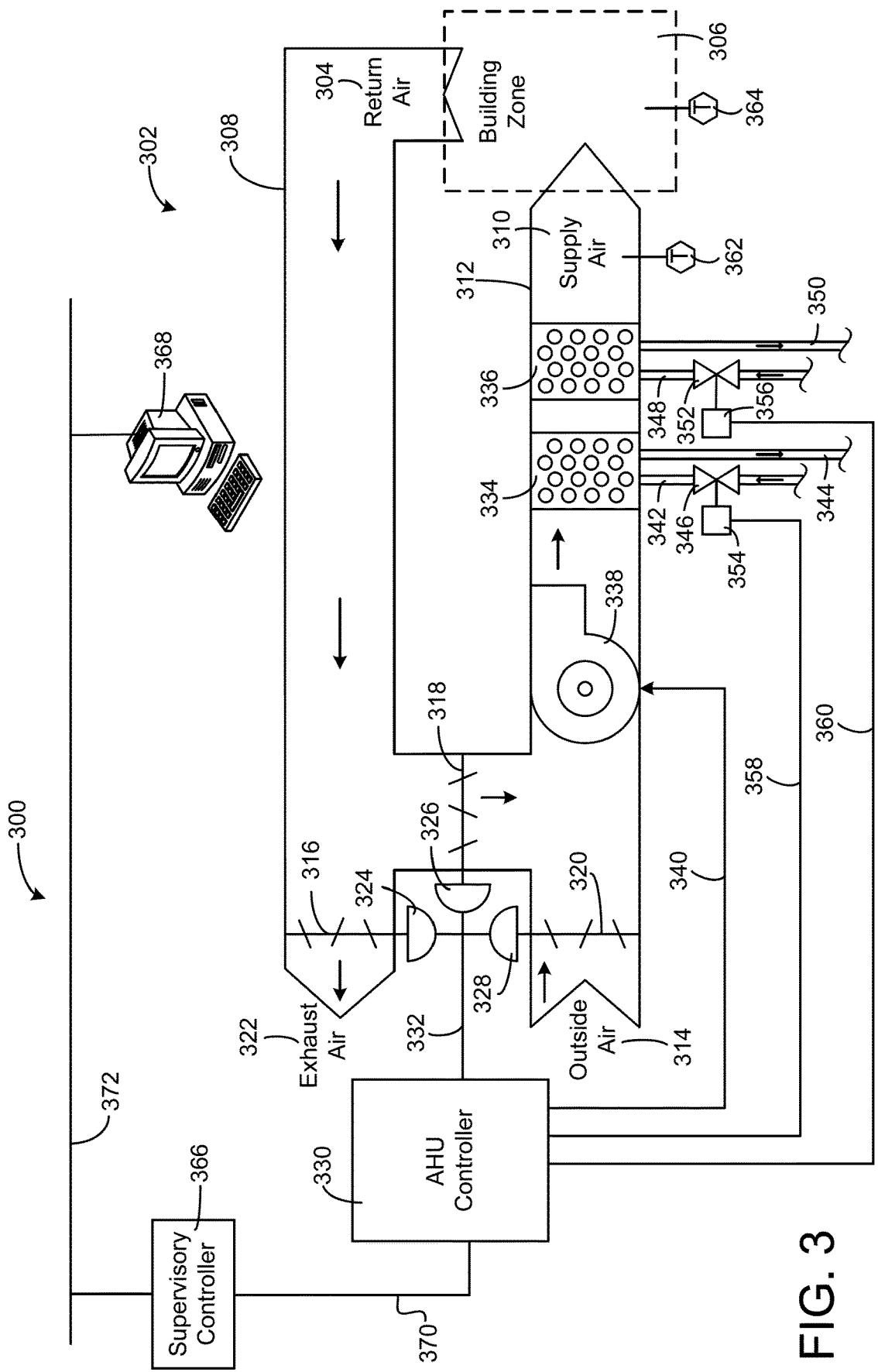
FIG. 3 is a block diagram of an airside system that uses the heated or chilled fluid provided by the waterside systems of FIG. 1 or 2 to heat or cool an airflow delivered to the building, according to some embodiments.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, ESC algorithms, PID control algorithms, model predictive control algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by supervisory controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by supervisory controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a supervisory controller 366 and a client device 368. Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with supervisory controller 366 and/or AHU controller 330 via communications link 372.

Supervisory controller 366 may include one or more computer systems (e.g., servers, BAS controllers, etc.) that serve as system level controllers, application or data servers, head nodes, or master controllers for airside system 300, waterside system 200, and/or HVAC system 100. Supervisory controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and supervisory controller 366 may be separate (as shown in FIG. 3) or integrated. In an integrated implementation, AHU controller 330 may be a software module configured for execution by a processor of supervisory controller 366.

In some embodiments, AHU controller 330 receives information from supervisory controller 366 (e.g., commands, setpoints, operating boundaries, etc.) and provides information to supervisory controller 366 (e.g., temperature measurements, valve or actuator positions, operating statuses, diagnostics, etc.). For example, AHU controller 330 may provide supervisory controller 366 with temperature measurements from temperature sensors 362-364, equipment on/off states, equipment operating capacities, and/or any other information that can be used by supervisory controller 366 to monitor or control a variable state or condition within building zone 306.

Predictive Optimization
Overview

Referring generally to FIGS. 4-9, systems and methods for performing optimizations for HVAC systems are shown and described, according to some embodiments. In some embodiments, the systems and methods described below incorporate a mixed-integer linear programming (MILP) formulation for optimal equipment scheduling and trajectory planning. Various formulations, decompositions, and approximation strategies are described in detail that can be utilized in solving optimization problems in real time to achieve near-optimal performance using relatively short time horizons. Further, surrogate models, as discussed in greater detail below, can be incorporated to reduce computational complexity of solving optimization problems with minimal effects on closed-loop performance.

The online computational requirements of closed-loop scheduling can be reduced by recognizing that each online optimization problem need not be solved to proven optimality. In some embodiments, the MILP problems can be solved by utilizing various branch-and-bound methods. In the branch-and-bound methods, a significant amount of time can be spent closing a small optimality gap without significantly improving solution quality. As equipment models available for HVAC central plant equipment are usually empirical and thus may not be completely accurate, it may be unnecessary to prove optimality for an already approximate model, as a solution at optimality may not be the exact optimal solution for real process equipment. Thus, a small optimality gap (e.g., roughly 1%, 2%, etc.) can be sufficient for the online scheduling problems that are discussed below. It should be appreciated that because of the rolling-horizon implementation, a small optimality gap for each open-loop schedule may not necessarily indicate that the system's closed-loop cost is suboptimal by the same amount as the small optimality gap. For example, an optimality gap of 1% may not indicate 1% sub-optimality. However, for production scheduling, suboptimal open-loop solutions may not excessively hurt closed-loop cost. Thus, while simulation may be necessary to determine acceptable optimality gaps for some systems, a small optimality gap (e.g., 1%) may nonetheless be an appropriate target. An added benefit of rescheduling frequently is that there may be a high-quality guess available at each time step, which can be obtained by shifting the schedule obtained at the previous time step. As such, a high quality schedule may be available within a small amount of time (e.g., within seconds, within milliseconds, etc.) of starting the optimization, with an objective function improving moderately as computational time increases.

Accordingly, an optimization model can be generated for this problem as described in greater detail below. Modifications can be made to the problem formulation as well as various decomposition and approximation techniques to enable an online solution of the combined airside/waterside scheduling and trajectory optimization problem to be generated. At each time step, a deterministic scheduling problem can be solved using the best available forecasts. Likewise, uncertainty can be addressed implicitly by revising the schedule at each time step. It should be appreciated that stochastic and robust formulations can be used for scheduling, but said formulations may be more computationally challenging and can be sensitive to uncertainty characterization. As an additional simplification to improve computational efficiency, transient dynamics associated with equipment startup and shutdown within the central plant can be ignored. While the transient dynamics could be approximated and included within the optimization problem, their effect may be minimal and can be further attenuated via dwell times and rate-of-change constraints. By contrast, transient dynamics of airside buildings can be critical to utilizing available passive storage and thus should be modeled with reasonable accuracy. Based on these and other simplifications as discussed herein, optimization strategies aimed at quickly finding quality (e.g., optimal or near-optimal) solutions to a combined airside/waterside optimization problem to improve process efficiency and decrease utility costs can be utilized.

It should be noted that the term "optimize" is used throughout the present disclosure to refer to the act of driving a variable of interest (e.g., predicted energy consumption, predicted cost, etc.) to or toward a maximum or minimum value. An optimization, as the term is used herein, may not require the variable of interest to actually reach the true maximum or minimum (i.e., maximum possible value or minimum possible value), but rather should be interpreted as the act of moving the variable interest toward that value. Accordingly, the term "optimize," the rephrase "performing an optimization," and the like should be understood to mean "move toward an optimum" which includes reducing a variable toward a minimum, increasing a variable toward a maximum, or otherwise moving in a direction that approaches the true optimal value, even if the true optimal value is never reached. Similarly, any references to "optimum," "optimal," and the like should be interpreted as the values that result from performing the optimization process, even if they are not the true optimal values. For example, an "optimal" temperature setpoint can be defined as the temperature setpoint that results from performing the optimization process described herein, even if that temperature setpoint is not the true optimal setpoint that could have been achieved.

HVAC Controller

Figure 4:
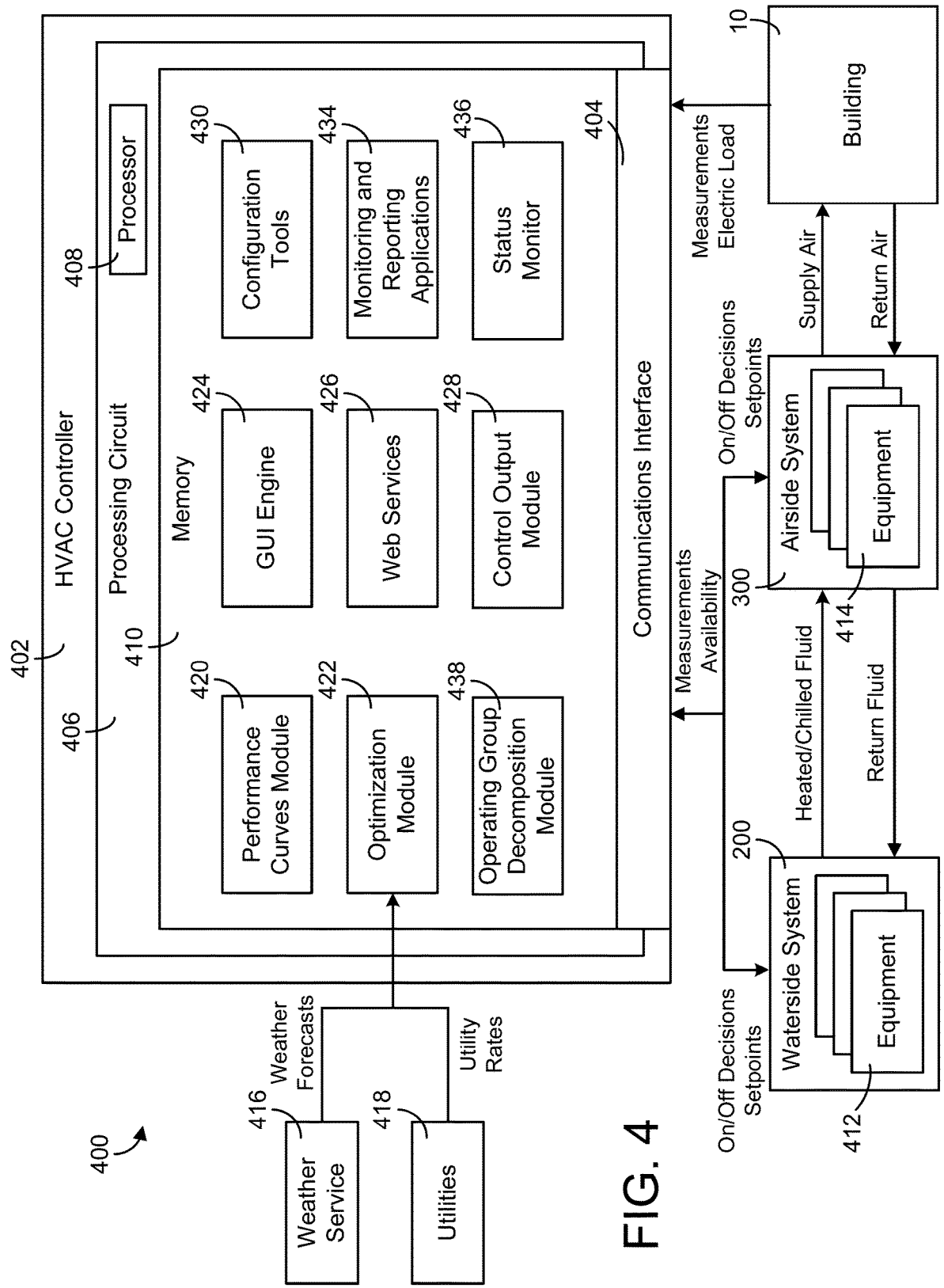
FIG. 4 is a block diagram of an HVAC control system, according to some embodiments.

Referring now to FIG. 4, an HVAC control system 400 is shown, according to some embodiments. HVAC control system 400 is shown to include an HVAC controller 402, waterside system 200, airside system 300, and building 10. As shown in FIG. 4, waterside system 200 operates to provide a heated or chilled fluid to airside system 300. Airside system 300 can use the heated or chilled fluid to heat or cool a supply airflow provided to building 10. HVAC controller 402 may be configured to monitor and control the HVAC equipment in building 10, waterside system 200, airside system 300, and/or other HVAC system or subsystems. In some embodiments, HVAC controller 402 is similar to and/or the same as the HVAC controller described in U.S. patent application Ser. No. 14/694,633, filed Apr. 23, 2015, the entirety of which is incorporated by reference herein.

In some embodiments, HVAC controller 402 is integrated within a single computer (e.g., one server, one housing, etc.). In some embodiments, HVAC controller 402 is distributed across multiple servers or computers (e.g., that can exist in distributed locations). In another exemplary embodiment, HVAC controller 402 may integrated with a building automation system (e.g., a METASYS® brand building management system, as sold by Johnson Controls, Inc.) or an enterprise level building manager configured to monitor and control multiple building systems (e.g., a cloud-based building manager, a PANOPTIX® brand building efficiency system as sold by Johnson Controls, Inc.).

HVAC controller 402 is shown to include a communications interface 404 and a processing circuit 406. Communications interface 404 may include wired or wireless interfaces (e.g., jacks, antennas, transmitters, receivers, transceivers, wire terminals, etc.) for conducting data communications with various systems, devices, or networks. For example, communications interface 404 may include an Ethernet card and port for sending and receiving data via an Ethernet-based communications network and/or a WiFi transceiver for communicating via a wireless communications network. Communications interface 404 may be configured to communicate via local area networks or wide area networks (e.g., the Internet, a building WAN, etc.) and may use a variety of communications protocols (e.g., BACnet, IP, LON, etc.).

Communications interface 404 may be a network interface configured to facilitate electronic data communications between HVAC controller 402 and various external systems or devices (e.g., building 10, waterside system 200, airside system 300, a weather service 416, utilities 418, etc.). For example, communications interface 404 may receive information from building 10 indicating one or more measured states of building 10 (e.g., temperature, humidity, electric loads, etc.). Communications interface 404 may also receive information from waterside system 200 and airside system 300 indicating measured or calculated states of waterside system 200 and airside system 300 (e.g., sensor values, equipment status information, on/off states, power consumption, equipment availability, etc.). Communications interface 404 may receive inputs from waterside system 200 and airside system 300 and may provide operating parameters (e.g., on/off decisions, setpoints, etc.) to waterside system 200 and airside system 300. The operating parameters may cause waterside system 200 and airside system 300 to activate, deactivate, or adjust a setpoint for various devices of equipment 412-414.

In some embodiments, HVAC controller 402 receives measurements from waterside system 200, airside system 300, and building 10 via communications interface 404. The measurements may be based on input received from various sensors (e.g., temperature sensors, humidity sensors, airflow sensors, voltage sensors, etc.) distributed throughout waterside system 200, airside system 300, and/or building 10. Such measurements may include, for example, supply and return temperatures of the heated fluid in hot water loop 214, supply and return temperatures of the chilled fluid in cold water loop 216, a temperature of building zone 306, a temperature of supply air 310, a temperature of return air 304, and/or other values monitored, controlled, or affected by HVAC control system 400. In some embodiments, HVAC controller 402 receives electric load information from building 10 indicating an electric consumption of building 10.

In some embodiments, HVAC controller 402 receives availability information from waterside system 200 and airside system 300 via communications interface 404. The availability information may indicate the current operating status of equipment 412-414 (e.g., on/off statuses, operating setpoints, etc.) as well as the available capacity of equipment 412-414 to serve a heating or cooling load. Equipment 412 may include the operable equipment of waterside system 200 such as the equipment of subplants 202-212 (e.g., heating elements 220, chillers 232, heat recovery chillers 226, cooling towers 238, pumps 222, 224, 228, 230, 234, 236, 240, hot thermal energy storage tank 242, cold thermal energy storage tank 244, etc.) as described with reference to FIG. 2. Equipment 414 may include the operable equipment of airside system 300 (e.g., fan 338, dampers 316-320, valves 346 and 352, actuators 324-328 and 352-354, etc.) as described with reference to FIG. 3. Individual devices of equipment 412-414 can be turned on or off by HVAC controller 402 to adjust the thermal energy load served by each device. In some embodiments, individual devices of equipment 412-414 can be operated at variable capacities (e.g., operating a chiller at 10% capacity or 60% capacity) according to an operating setpoint received from HVAC controller 402. The availability information pertaining to equipment 412-414 may identify a maximum operating capacity of equipment 412-414, a current operating capacity of equipment 412-414, and/or an available (e.g., currently unused) capacity of equipment 412-414 to generate resources used to serve heating or cooling loads (e.g., hot water, cold water, airflow, etc.).

HVAC controller 402 is shown to receive weather forecasts from a weather service 416 and utility rates from utilities 418. The weather forecasts and utility rates may be received via communications interface 404 and/or a separate network interface. Weather forecasts may include a current or predicted temperature, humidity, pressure, and/or other weather-related information for the geographic location of building 10. Utility rates may indicate a cost or price per unit of a resource (e.g., electricity, natural gas, water, etc.) provided by utilities 418 at each time step in a prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 418 or predicted utility rates.

In some embodiments, the utility rates include demand charges for one or more resources provided by utilities 418. A demand charge may define a separate cost imposed by utilities 418 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Utilities 418 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Still referring to FIG. 4, processing circuit 406 is shown to include a processor 408 and memory 410. Processor 408 may be a general purpose or specific purpose processor, an application specific integrated circuit (ASIC), one or more field programmable gate arrays (FPGAs), a group of processing components, or other suitable processing components. Processor 408 may be configured to execute computer code or instructions stored in memory 410 or received from other computer readable media (e.g., CDROM, network storage, a remote server, etc.).

Memory 410 may include one or more devices (e.g., memory units, memory devices, storage devices, etc.) for storing data and/or computer code for completing and/or facilitating the various processes described in the present disclosure. Memory 410 may include random access memory (RAM), read-only memory (ROM), hard drive storage, temporary storage, non-volatile memory, flash memory, optical memory, or any other suitable memory for storing software objects and/or computer instructions. Memory 410 may include database components, object code components, script components, or any other type of information structure for supporting the various activities and information structures described in the present disclosure. Memory 410 may be communicably connected to processor 408 via processing circuit 406 and may include computer code for executing (e.g., by processor 408) one or more processes described herein. Memory 410 may include fewer, additional, and/or different components than as shown in FIG. 4. In some embodiments, one or more components of memory 410 are included in a single component. However, each component of memory 410 is shown separately for ease of explanation.

Memory 410 is shown to include a status monitor 436. Status monitor 436 may receive and store status information relating to building 10, waterside system 200, and/or airside system 300. For example, status monitor 436 may receive and store data regarding the overall building or building space to be heated or cooled. In some embodiments, status monitor 436 may include a graphical user interface component configured to provide graphical user interfaces to a user for selecting building requirements (e.g., overall temperature parameters, selecting schedules for the building, selecting different temperature levels for different building zones, etc.). HVAC controller 402 may determine on/off configurations and operating setpoints to satisfy the building requirements received from status monitor 436.

In some embodiments, status monitor 436 receives, collects, stores, and/or transmits cooling load requirements, building temperature setpoints, occupancy data, weather data, energy data, schedule data, and/or other building parameters. In some embodiments, status monitor 436 stores data regarding energy costs, such as pricing information available from utilities 418 (energy charge, demand charge, etc.). In some embodiments, status monitor 436 stores the measurements and availability information provided by waterside system 200 and airside system 300. Status monitor 436 may provide the stored status information to optimization module 422 for use in optimizing the performance of systems 200-300.

Still referring to FIG. 4, memory 410 is shown to include a performance curves module 420. Performance curves module 420 may store performance curves (also referred to as efficiency curves, equipment curves, or subplant curves) that describe relationships between inputs and outputs for various devices of equipment 412-414. For example, a performance curve for chiller subplant 206 may indicate the rate of utility use by subplant 202 (e.g., electricity use measured in kW, water use measured in L/s, etc.) as a function of the subplant load (e.g., cold water production, water supply temperature, etc.). Performance curves may be defined for a single device of equipment 412-414 (e.g., a single pump, a single chiller, a single boiler, etc.) or a collection of devices of equipment 412-414 (e.g., chiller subplant 206, heater subplant 202, etc.). Performance curves may define the rate at which a device or collection of devices produces a first resource (e.g., hot water, chilled water, etc.) as a function of the rate at which the device or collection of devices consumes a second resource (e.g., electricity, natural gas, water, etc.). The performance curves may be N-dimensional curves (e.g., one dimensional curves, two-dimensional curves, three-dimensional curves, or higher-dimensional curves) defining the production of one or more output resources as a function of one or more input resources. In general, the performance curves may define relationships between N independent variables or N total variables.

In some embodiments, performance curves are provided by a device manufacturer or are generated using experimental data. In some embodiments, the performance curves are based on an initial performance curve provided by a device manufacturer and updated using experimental data. In some embodiments, performance curves module 420 generates a performance curve for a group of equipment 412-414 (e.g., a subplant curve for one of subplants 202-212) by combining performance curves for individual devices of the group. The performance curves for some devices may indicate that resource consumption is a nonlinear function of load. Accordingly, if multiple performance curves are combined into a performance curve for an entire subplant, the resultant subplant curve may be a wavy (i.e., non-convex) curve. The waves are caused by a single device loading up before it is more efficient to turn on another device to satisfy the subplant load.

Performance curves module 420 may be configured to convert non-convex performance curves into convex performance curves. A convex curve can refer to a curve for which a line connecting any two points on the curve is always above or along the curve (i.e., not below the curve). Convex curves may be advantageous for use in the optimization process performed by optimization module 422 because they allow for an optimization process that is less computationally expensive relative to an optimization process that uses non-convex functions. Performance curves module 420 may be configured to break performance curves into piecewise linear segments that combine to form a piecewise-defined convex curve. Performance curves module 420 may provide the performance curves to optimization module 422 for use in the optimization process.

Still referring to FIG. 4, memory 410 is shown to include an optimization module 422. Optimization module 422 may optimize the performance of airside system 300 and waterside system 200. For example, optimization module 422 may determine an optimal set of control outputs (e.g., equipment on/off decisions and/or operating setpoints) for equipment 412-414 that optimize (e.g., minimize) the cost of energy consumed by waterside system 200 and airside system 300 to maintain conditions in building 10 within acceptable limits. The optimal control outputs determined by optimization module 422 may optimize the total monetary cost (e.g., dollars) of the resources consumed by systems 200-300 (e.g., electricity, natural gas, water, etc.) to operate systems 200-300 over a predetermined time horizon. The optimization may be performed over a long time horizon and may account for time-of-use energy prices and demand charges received from utilities 418.

Advantageously, optimization module 422 may optimize the performance of waterside system 200 and airside system 300 using a single unified airside/waterside optimization. Previous approaches to airside and waterside optimization explicitly consider the airside and waterside optimization problems separately. For example, U.S. patent application Ser. No. 14/634,609 titled "High Level Central Plant Optimization" and filed Feb. 27, 2015, uses a cascaded approach to central plant optimization. The entire disclosure of U.S. patent application Ser. No. 14/634,609 is incorporated by reference herein. The cascaded approach performs the airside optimization first to predict the heating and cooling loads of the building. In the cascaded approach, the predicted heating and cooling loads can be provided as a fixed parameter to the waterside optimization, which is performed second to optimize the performance of the central plant.

The single unified airside/waterside optimization performed by optimization module 422 advantageously solves the airside optimization problem and the waterside optimization problem simultaneously. This advantage allows optimization module 422 to determine an optimal behavior of airside system 300 based on the control decisions made with respect to waterside system 200, and vice versa. Optimization module 422 is described in greater detail with reference to FIG. 6.

Still referring to FIG. 4, memory 410 is shown to include a control output module 428. Control output module 428 may store historical data regarding past operating statuses, past operating setpoints, and instructions for calculating and/or implementing control parameters waterside system 200 and airside system 300. Control output module 428 may also receive, store, and/or transmit data regarding the conditions of individual devices of equipment 412-414, such as operating efficiency, equipment degradation, a date since last service, a lifespan parameter, a condition grade, or other device-specific data. Control output module 428 may receive data from waterside system 200 and airside system 300 via communications interface 404. Control output module 428 may also receive and store on/off statuses and operating setpoints determined by optimization module 422.

Data and processing results from optimization module 422, control output module 428, or other modules of HVAC controller 402 may be accessed by (or pushed to) monitoring and reporting applications 434. Monitoring and reporting applications 434 may be configured to generate real time "system health" dashboards that can be viewed and navigated by a user (e.g., a central plant engineer). For example, monitoring and reporting applications 434 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

HVAC controller 402 may include one or more GUI servers, web services 426, and/or GUI engines 424 to support monitoring and reporting applications 434. In some embodiments, applications 434, web services 426, and GUI engine 424 may be provided as separate components outside of HVAC controller 402 (e.g., as part of a smart building manager). HVAC controller 402 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. HVAC controller 402 may be configured to provide the results of any such processing to other databases, tables, XML files, or other data structures for further querying, calculation, or access by, for example, external monitoring and reporting applications.

Memory 410 is shown to include configuration tools 430. Configuration tools 430 can allow a user to define (e.g., via graphical user interfaces, via prompt-driven "wizards," etc.) how HVAC controller 402 should react to changing conditions in waterside system 200 and/or airside system 300. In some embodiments, configuration tools 430 can allow a user to build and store condition-response scenarios that can cross multiple central plant devices, multiple building systems, and multiple enterprise control applications (e.g., work order management system applications, entity resource planning applications, etc.). For example, configuration tools 430 can provide the user with the ability to combine data (e.g., from subsystems, from event histories) using a variety of conditional logic. According to various embodiments, the conditional logic can range from simple logical operators between conditions (e.g., AND, OR, XOR, etc.) to pseudo-code constructs or complex programming language functions (e.g., allowing for more complex interactions, conditional statements, loops, etc.). Configuration tools 430 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 5:
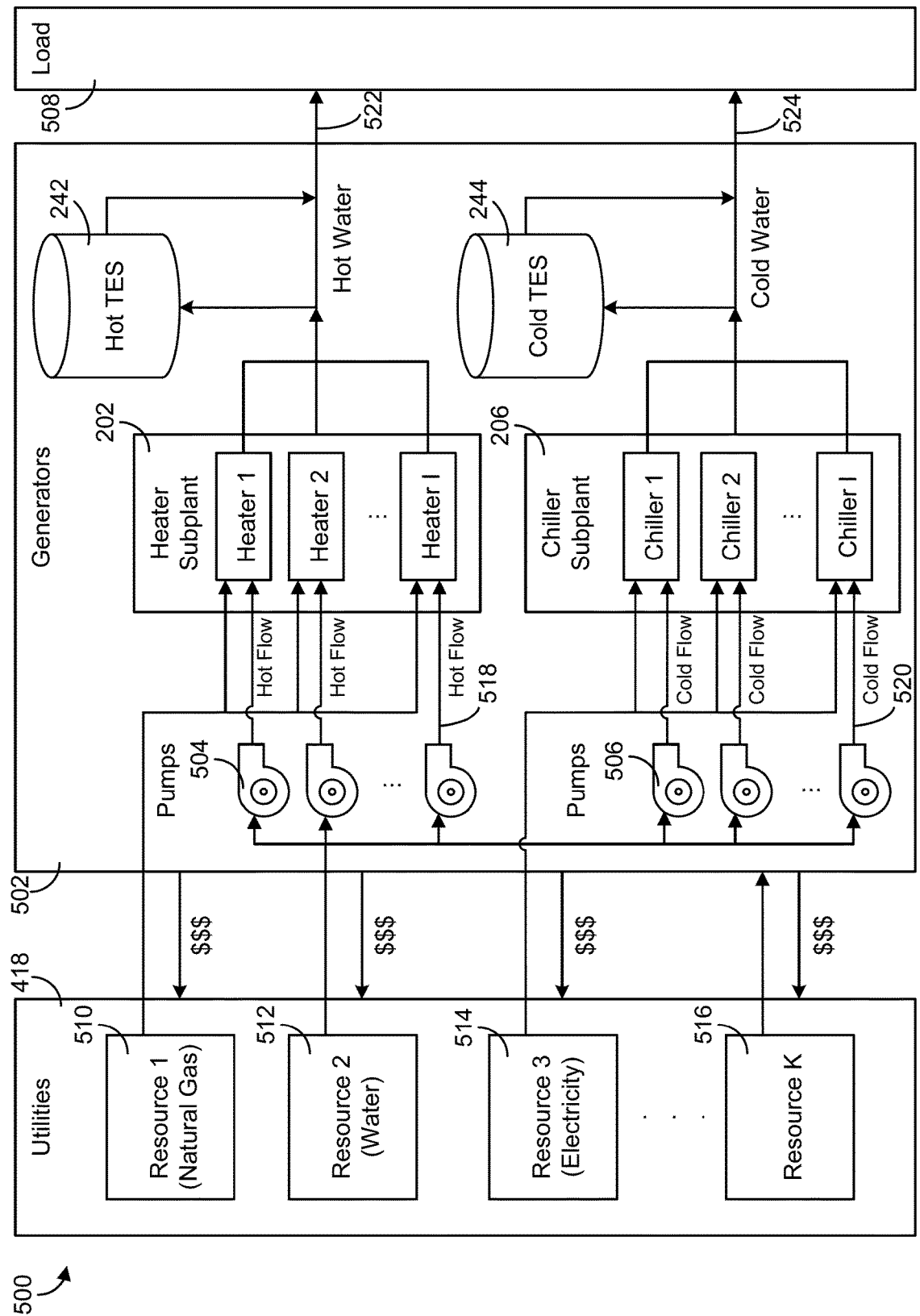
FIG. 5 is a diagram illustrating a formulation of an optimization problem solved by an optimization module of the HVAC control system of FIG. 4, according to some embodiments.

Referring now to FIG. 5, a diagram 500 illustrating a formulation of the optimization problem solved by optimization module 422 is shown, according to some embodiments. In this formulation, all of the utilities provided by utilities 418 (e.g., electricity, natural gas, water, etc.) and the water streams generated by waterside system 200 (e.g., hot water, cold water, etc.) are considered different types of resources. Some resources can be purchased from utilities 418 at time-varying prices and may be subject to demand charges. For example, diagram 500 shows utilities 418 providing a first resource 510 (natural gas), a second resource 512 (water), a third resource 514 (electricity), and a Kth resource 516 to generators 502 in exchange for monetary payments ($$$). Although only a few purchased resources 510-516 are shown in diagram 500, it should be understood that resources 510-516 can include any number and/or type of resource capable of being received or purchased from another entity. The optimization problem solved by optimization module 422 may seek to optimize (e.g., minimize) the total amount of the monetary payments provided to utilities 418 in exchange for purchased resources 510-516 over a predetermined time horizon, subject to a variety of optimization constraints.

In diagram 500, various devices or groups of devices are designated as generators 502. For example, generators 502 are shown to include heater water pumps 504, chiller water pumps 506, heater subplant 202, chiller subplant 206, hot thermal energy storage (TES) 242, and cold TES 244. Each of generators 502 can consume a first set of resources and produce a second set of resources. For example, heater water pumps 504 are shown consuming resource 512 (water) and producing resource 518 (hot flow). Chiller water pumps 506 are shown consuming resource 512 (water) and producing resource 520 (cold flow). Heater subplant 202 is shown consuming resource 510 (natural gas) and resource 512 (water) and producing resource 522 (hot water). The hot water resource 522 may be provided to load 508 (e.g., airside system 300 or building 10) or stored in hot TES 242 for subsequent use. Chiller subplant 206 is shown consuming resources 512 (water) and resource 514 (electricity) and producing resource 524 (cold water). The cold water resource 524 may be provided to load 508 or stored in cold TES 244 for subsequent use. Relationships between the resources produced and consumed by each of generators 502 may be defined by the performance curves stored in performance curves module 420 for the corresponding generators 502.

Although only a few generators 502 are shown in diagram 500, it should be understood that generators 502 can include any system, device, or collection of devices that consumes a first set of resources to produce a second set of resources. For example, generators 502 may include any of subplants 202-212, heating elements 220, chillers 232, heat recovery chillers 226, cooling towers 238, fan 338, cooling coil 334, heating coil 336, or any other equipment of waterside system 200 or airside system 300. Optimization module 422 may apply constraints to the optimization problem to ensure that the total supply of each resource (i.e., the amount of each resource produced by generators 502, dispensed from TES 242-244, and purchased from utilities 418) meets or exceeds the total demand for the resource (i.e., the amount of the resource consumed by generators 502, added to TES 242-244, and delivered to load 508) at each time step in the prediction window.

Figure 6:
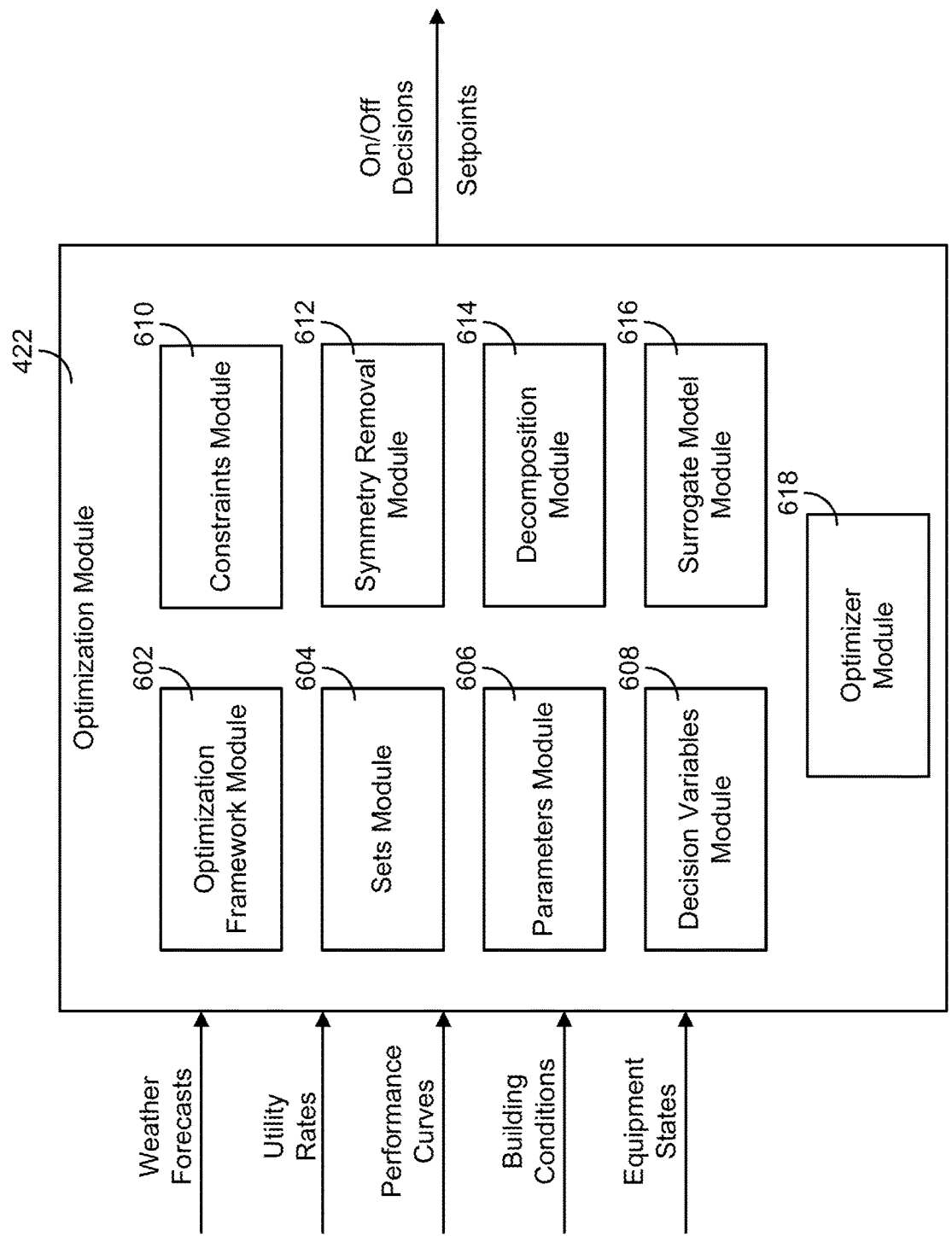
FIG. 6 is a block diagram illustrating the optimization module of FIG. 4 in greater detail, according to some embodiments.

Referring now to FIG. 6, a block diagram illustrating optimization module 422 in greater detail is shown, according to some embodiments. Optimization module 422 is shown to receive several data inputs including weather forecasts from weather service 416, utility rates from utilities 418, performance curves from performance curves module 420, building conditions from status monitor 436 or building 10, and equipment states from waterside system 200 and airside system 300. Optimization module 422 may use the data inputs to formulate an optimization problem and solve the optimization problem to determine an optimal set of control outputs for waterside system 200 and airside system 300.

An optimization problem may include a formulation of an objective function (e.g., a cost function to be optimized), constraints on the optimization process (e.g., acceptable temperature ranges for building 10, device capacities, etc.), variables to be optimized (e.g., equipment on/off states, operating setpoints, etc.), and/or parameters used in the objective function. All of these components may be used by optimization module 422 to solve the optimization problem and are described in greater detail below.

In some embodiments, optimization module 422 solves the optimization problem using a linear optimization procedure (e.g., mixed integer linear programming, basis exchange, interior point, etc.) to determine optimal operating states (e.g., on/off decisions, setpoints, etc.) for equipment 412-414. The optimal operating states may optimize (e.g., minimize) the cost of operating equipment 412-414 over a predetermined time period, subject to the optimization constraints. Advantageously, the linear optimization process performed by optimization module 422 can generate optimal control decisions for both waterside system 200 and airside system 300 simultaneously using a single unified optimization process. In some embodiments, optimization module 422 modifies the results of the linear optimization process to account for inaccuracies in the linearized performance curves and to determine setpoints for individual devices within various equipment groups. Optimization module 422 may use the optimal control decisions to generate and dispatch control signals for equipment 412-414.

Optimization module 422 is shown to include an optimization framework module 602. In some embodiments, optimization framework module 602 can select and/or establish an optimization framework for use in calculating/determining optimal control decisions for building equipment. In some embodiments, optimization framework module 602 uses linear programming as the optimization framework. For example, optimization framework module 602 may define an objective function as a linear combination of decision variables (e.g., equipment on/off states, operating setpoints, etc.) and parameters.

In some embodiments, the objective function is a predictive cost model defining a total cost (e.g., monetary cost) of operating waterside system 200 and airside system 300 over a predetermined optimization period. For example, optimization framework module 602 may define the objective function J in a simplified form as follows:

$$J = \min(F^{WS} + F^{AS})$$

where $F^{WS}$ is an objective function defining waterside system 200 and $F^{AS}$ is an objective function defining airside system 300. $F^{WS}$ and $F^{AS}$ are described in greater detail below. The objective function J shown above minimizes a total of $F^{WS}$ and $F^{AS}$. It should be appreciated that optimization of J is shown as a minimization of J above for sake of example. In various embodiments, an optimal solution to J may be considered a maximization of J, a minimization a magnitude between a cost associated with J and a target value, or other various standards for which optimization can be based on.

As described in detail below, sets can be denoted herein using boldface roman characters. The sets of real numbers and integers are denoted as R and Z respectively. Indexing sets can be defined as described with reference to sets module 604. Decision variables used in the predictive model are denoted by upper-case roman characters and are defined as described with reference to decision variables module 608. Parameters of the model are denoted by lower-case Greek characters with one exception in that initial conditions for dynamic decision variables are denoted by the decision variable with the subscript 0. Parameters of the predictive model are described in greater detail with reference to parameters module 606.

Optimization module 422 is shown to include a sets module 604. Sets module 604 can define various sets that can be utilized by optimization framework module 602 in generating the optimization framework (e.g., in generating the objective function J). In particular, sets modules 604 can define a set of temperature zones i∈I for a building, a set of generators j∈J, a set of resources/utilities k∈K, a set of time steps t∈T, a set of interpolation regions for equipment models m∈M, a set of interpolation points for equipment models n∈N, a set of interpolation regions $M_j \subseteq M$ for generator j, and a set of interpolation points $N_{jm} \subseteq N$ for generator j in region m.

Optimization module 422 is also shown to include a parameters module 606.

Parameters module 606 can be configured to store and manage parameters used in the optimization framework (e.g., in the predictive model) associated with optimization framework module 602. In some embodiments, some and/or all of the parameters defined by parameters module 606 are given based on available forecasts or desired system performance. A list of parameters that can be defined by parameters module 606 is provided in Table 1 below:

TABLE 1

List of Parameters

| Symbol | Description |
| --- | --- |
| $\phi_{kt}$ | Forecasted secondary resource demand |
| $\rho_{kt}$ | Forecasted resource prices |
| $\rho_k^{max}$ | Demand charge |
| $\psi_{kt}$ | Exogenous demand included in peak calculation |
| $\beta_{kt}$ | Penalty for unmet secondary demand |
| $\Theta_{it}^-, \Theta_{it}^+$ | Lower and upper temperature comfort bounds for zones |
| $\Pi_k^{max}$ | Previous maximum resource demand |
| $\mu_j$ | Number of units of each type available for use |
| $\zeta_{jknt}$ | Interpolation points for piecewise-linear models |
| $\sigma_k$ | Fractional retention of stored resource |
| $\delta_j^+, \delta_j^-$ | Minimum on/off dwell time for generators |
| $\Pi_k$ | Upper bound for resource purchase |
| $Y_k$ | Bound for single-period storage charge/discharge |
| $\Sigma_k$ | Storage capacity |
| $\alpha_{ii'}, \omega_{i'i k}$ | Dynamic coefficients in airside model |
| $\theta_{it}$ | Time-varying temperature disturbance for zones |
| $\chi_{it}^+, \chi_{it}^-$ | Penalties for comfort violation in zones |
| $\Gamma_{ik}$ | Upper bound on resource flow to zones |
| $\xi_{jnt}$ | Part-load coefficients for piecewise-linear models |
| $\lambda_{ikt}$ | Dual multiplier for resource supply to airside |

Optimization module 422 is also shown to include a decision variables module 608. Decision variables module 608 can store and manage variables used in the optimization framework (e.g., in the predictive model) associated with optimization framework module 602. A list of decision variables that can be defined by decision variables module 608 is provided in Table 2 below:

TABLE 2

List of Decision Variables

| Symbol | Description |
| --- | --- |
| $U_{jt} \in \{0, \ldots, \mu_j\}$ | Integer number of generators on during a given time |
| $U_{jt}^+, U_{jt}^-$ | Number of generators switched on/off at the beginning of a time step |
| $Q_{jkt}$ | Production of resources in equipment |
| $P_{kt} \in [0, \Pi_k]$ | Amount of purchased resources |
| $P_k^{max} \in [\Pi_k^{max}, \infty]$ | Maximum single-step purchase of resource k |
| $Y_{kt} \in [-Y_k, Y_k]$ | Charge (<0) or discharge (>0) of stored resources |
| $S_{kt} \in [0, \Sigma_k]$ | Stored inventory at the end of a time period |
| $B_{kt} \in [0, \phi_{kt}]$ | Unmet secondary demand |
| $V_{jmt} \in \{0, \ldots, \mu_j\}$ | Number of units operating in each interpolation region |
| $Z_{jmnt} \in [0, \mu_j]$ | Weighting of interpolation points in each region |
| $X_{it}$ | States of the airside dynamic model |
| $T_{it}$ | Zone temperature of zone at end of a time step |
| $G_{ikt} \in [0, \Gamma_{ik}]$ | Primary demand of resources by zones |
| $T_{it}^+, T_{it}^-$ | Positive and negative comfort violation for zones |

The variables defined herein may be described in reference to specific components/spaces of a building (e.g., zones of a building). For example, $G_{ikt}$ is defined above as a primary demand of resources by zones. It should be understood, however, that the variables and/or other mathematical components defined herein can be applied to other spaces in buildings and/or the buildings themselves. For example, various augmentations can be applied to equations, variables, sets, etc. defined herein such that $G_{ikt}$ can describe the primary demand of resources by entire buildings, individual spaces within zones, etc.

In some embodiments, the goal of the optimization problem to be solved by optimization module 422 is to optimize (e.g., minimize) operating costs of the combined airside/waterside system over a finite horizon (e.g., optimization period) indexed by discrete time steps $t \in T$. Given one or more buildings divided into temperature zones $i \in I$, the optimization can seek to optimally schedule generators $j \in J$ to consume and produce resources/utilities $k \in K$ in order to maintain comfortable zone temperatures and meet auxiliary demand over the horizon. In this problem formulation, "generator" can refer to equipment in the heating/cooling central plant. Production and consumption can be modeled by $Q_{jkt}$. In this case, $Q_{jkt} < 0$ can indicate that generator j is consuming resource k during time step t and $Q_{jkt} > 0$ can indicate production of resource k. Some of the produced resources can be sent to the temperature zones via primary demand $G_{ikt}$ to raise (e.g., by hot water) or lower (e.g., by chilled water) the zone temperature to maintain comfort. Other resources can be produced and consumed completely within the central plant and thus do not affect the temperature zones (e.g., cooling water can be produced in cooling towers and consumed in chillers). The remaining resources (e.g., electricity and natural gas) may not be able to be produced in the generators and thus should be purchases from the utility market via variables $P_{kt}$ subject to prices $\rho_{kt}$ which may be time-varying. In order to exploit the pricing structure, some resources may be stored in storage tanks so that the resources can be produced if utility prices are cheap and consumed if the utility prices are expensive.

To accurately predict resource consumption within the system, models may be needed for airside temperature dynamics and waterside equipment profiles. Said models may be obtained/generated by optimization framework module 602. For the airside temperature, a discrete-time linear dynamic model can be used that predicts zone temperature $T_{it}$ at the next time step as a linear combination of current zone temperatures and hot/chilled water primary demand $G_{ikt}$ consumed by the zones. Throughout the optimization period, zone temperatures may be required to be maintained within a specified comfort range.

For waterside equipment, static equipment models can be approximated by optimization framework module 602 as piecewise-linear operating surfaces that constrain the various production and consumption rates. For examples, in chillers, the independent decision variable can be chilled water production with dependent variables of electricity and cooling water consumption. Thus, in said example, the operation surface may be a one-dimensional piecewise-linear curve with chilled water positive (indicating production) and other resources negative (indicating consumption). In this case, the decision variables $Q_{jkt}$ can be constrained by optimization framework module 602 to lie on the manifold. It should be appreciated that all generators can be on or off and may have nonzero minimum capacity, which can indicate that all of the generators can include the (possible isolated) operating point $Q_{jkt} = 0$. In this case, the manifold may be an approximation of a nonlinear equipment model chosen as the piecewise-linear function with a fewest number of breakpoints for which the uniform-grid gives an approximation error below a certain value (e.g., 0.1%). Fewer pieces can be used to reduce solution times, at the expense of lower modeling accuracy.

Based on the problem characteristics described above, optimization framework module 602 can formulate an MILP optimization model.

Still referring to FIG. 6, optimization module 422 is shown to include a constraints module 610. Constraints module 610 can generate constraints that can be applied to the optimization problem formulated by optimization framework module 602. In particular, the constraints generated by constraints module 610 may be applied to an objective function(s) of the optimization problem.

In some embodiments, constraints module 610 generates constraints associated with the waterside system. As mentioned above, the equipment operating surface on which production $Q_{j}kt$ should lie may be a piecewise-linear manifold that can be modeled using auxiliary variables and the following three equations:

$$Q_{jkt} = \sum_{m \in M_j} \sum_{n \in N_{jm}} \zeta_{jknt} Z_{jmnt}, \; j \in J, k \in K, t \in T \quad \text{(Eq. 1)}$$

$$\sum_{m \in M_j} V_{jmt} = U_{jt}, \; j \in J, t \in T \quad \text{(Eq. 2)}$$

$$\sum_{n \in N_{jm}} Z_{jmnt} = V_{jmt}, \; j \in J, m \in M_j, t \in T \quad \text{(Eq. 3)}$$

where $U_{jt} \in \{0,1\}$ determine whether each generator is on or off, and where $V_{jmt} \in \{0,1\}$ and $Z_{jmnt} \in [0,1]$ are auxiliary variables used to model the piecewise linear approximate equipment models. Advantageously, the above equations make no distinctions between independent and dependent variables and are amenable to symmetry removal.

Based on the above equations, constraints module 610 can generate constraints on on/off switching by generating the following constraints:

$$U_{jt} - U_{j(t-1)} = U_{jt}^+ - U_{jt}^-, j \in J, t \in T \quad \text{(Eq. 4)}$$

$$U_{jt} \geq \Sigma_{t'=0}^{\delta_j - 1^+} U_{j(t-t')}^+, j \in J, t \in T \quad \text{(Eq. 5)}$$

$$1 - U_{jt} \geq \Sigma_{t'=0}^{\delta_j - 1^-} U_{j(t-t')}^-, j \in J, t \in T \quad \text{(Eq. 6)}$$

in which the first constraint above is utilized to determine when a switch takes place and the remaining constraints prevent nearby switches.

Further, constraints module 610 can generate a constraint related to a charge $S_{kt}$ on storage tanks which can be given by the following equation:

$$S_{kt} = \sigma_k S_{k(t-1)} - Y_{kt}, k \in K, t \in T \quad \text{(Eq. 7)}$$

where $Y_{kt}$ is the amount charged into (<0) or discharged from (>0) the storage tank in time step t. The coefficient $\sigma_k$ can model decay of stored resources due to incomplete insulation. In some embodiments, storage levels are bounded by constraints module 610 such that the storage levels are between 0 and a maximum capacity $\Sigma_k$ (where $\Sigma_k = 0$ for resources with no storage). In some embodiments, nonzero lower bounds can be included as soft constraints to serve as a hedge against uncertainty. These levels can serve as a "safety stock" to avoid activating additional generators in case demand is higher than expected and if storage is low.

In association with the waterside constraints generated by constraints module 610, optimization framework module 602 can define a waterside objective function $F^{WS}$ that considers both time-varying use charges (i.e., amounts $P_{kt}$ and prices $\rho_{kt}$) as well as peak demand charges (i.e., amounts $P_k^{max}$ and costs $\rho_k^{max}$) as follows:

$$F^{WS} = \sum_{k \in K} \left( \rho_k^{max} P_k^{max} + \sum_{t \in T} (\rho_{kt} P_{kt} + \beta_{kt} B_{kt}) \right) \quad \text{(Eq. 8)}$$

where $B_{kt}$ is a slack variable for auxiliary demand. In this case, peak demand $P_k^{max}$ can be given by the following equation:

$$P_{kt} + \psi_{kt} \leq P_k^{max}, \forall k \in K, t \in T \quad \text{(Eq. 9)}$$

where $\psi_{kt}$ is a forecast of exogenous resource use which takes place regardless of operation of the central plant and can be included in the demand charge calculation. The time-of-use costs may assume that time-varying prices are known, and so the formulation is natural for cases such as fixed (but still time-varying) rate structures or forecastable spot prices. For other more complicated rate structures (e.g., structures in which bids must be placed) may require an additional decision-making layer and, in some cases, a slight reformulation of the cost calculation.

Constraints module 610 can also define airside constraints associated with an airside objective function $F^{AS}$. In particular, constraints module 610 can generate constraints for zone temperatures. Temperature evolution can be modeled within airside zones via a linear dynamic model given by the following:

$$T_{it} = \sum_{i' \in I} \left( \alpha_{ii'} T_{i'(t-1)} + \sum_{k \in K} \omega_{ii'k} G_{i'kt} \right) + \theta_{it} \quad \text{(Eq. 10)}$$

where $\alpha_{ii'}$ and $\omega_{ii'k}$ define the core time-invariant system dynamics, and $\theta_{it}$ represents the time-varying portion. $\theta_{it}$ can include effects of ambient temperature and radiation. It should be appreciated that the above formulation can be extended to use a generic linear state-space model for temperature evolution, provided that the zone temperatures $T_{it}$ and resource consumptions $G_{ikt}$ are outputs of the model. For simplicity, however, the above equation is given in the less general form.

Based on the above equation for zone temperature $T_{it}$, constraints module 610 can generate the following constraints on the zone temperature:

$$T_{it} \leq \Theta_{it}^+ + T_{it}^+, i \in I, t \in T \quad \text{(Eq. 11)}$$

$$T_{it} \geq \Theta_{it}^- - T_{it}^-, i \in I, t \in T \quad \text{(Eq. 12)}$$

where $\Theta_{it}^+$ and $\Theta_{it}^-$ give the nominal temperature bounds and nonnegative slacks $T_{it}^+$ and $T_{it}^-$ provide softening of the constraints. Respective of the constraints, optimization framework module 602 can generate the airside objective function $F^{AS}$ with a penalty term as follows:

$$F^{AS} = \sum_{t \in T} \sum_{i \in I} (\chi_{it}^+ T_{it}^+ + \chi_{it}^- T_{it}^-) \quad \text{(Eq. 13)}$$

where $\chi_{it}^+$ and $\chi_{it}^-$ are penalties for comfort violations in zones.

In some embodiments, constraints module 610 generates hard constraints separate from and/or in addition to constraints on the zone temperature defined above. Hard constraints generated by constraints module 610 can limit a temperature of the building within a predetermined range. For example, a maximum hard constraint and a minimum hard constraint may be generated and applied during optimization such that a temperature of a zone cannot exceed 80° F. or fall below 60° F. If hard constraints are used in place of the soft constraints that result in penalties for comfort violations as defined above, the objective function may not include the penalty term defined above and therefore may only sum waterside costs. However, if the hard constraints are used in tandem with the soft constraints, penalties $\chi_{it}^+$ and $\chi_{it}^-$ may penalization the airside objective function $F^{AS}$ for comfort violations beyond a small range of temperatures (e.g., beyond a range of 70° F. to 75° F.) whereas the hard constraints can completely restrict temperatures within a larger range (e.g., between 60° F. to 80° F.). In this case, the smaller range defined by the soft constraints may be within a range defined by the hard constraints.

In some embodiments, constraints module 610 generates constraints associated with coupling between the waterside and airside systems. For example, constraints module 610 can generate the following demand satisfaction constraint associated with said coupling:

$$\sum_{j \in J} Q_{jkt} + Y_{kt} + P_{kt} + B_{kt} \geq \phi_{kt} + \sum_{i \in I} G_{ikt}, k \in K, t \in T \quad \text{(Eq. 14)}$$

where the sum of airside demand $G_{ikt}$ and auxiliary demand $\phi_{kt}$ must be met through a combination of direct production $Q_{jkt}$, storage charge/discharge $Y_{kt}$, and purchase $P_{kt}$. The slack variable $B_{kt} \leq \phi_{kt}$ is added in the above constraint to soften the auxiliary demand constraint, while the primary demand is softened via the temperature slacks $T_{it}^+$ and $T_{it}^-$ described above.

Coupling the airside demand and waterside demand can provide various advantages over traditional systems. In traditional systems, airside demand is provided as a fixed input to a waterside optimization. This does not allow for any optimization or other cost/energy saving measures to be accounted for with regard to the airside demand. By coupling the airside demand and waterside demand, the airside demand can be optimized along with the other variables rather than being provided as a fixed input to the waterside optimization. Said coupling can result in a more accurate understanding of airside demand, thereby allowing more accurate control decisions to be made for building equipment. Increased accuracy of control decisions can reduce operating costs, improve energy savings, reduce excessive equipment degradation due to excessive operation resulting from inaccurate airside demand estimations, etc.

Based on modules 604-610, optimization framework module 602 can generate an overall objective function that can be given by the following:

$$J = \min(F^{WS} + F^{AS}) \quad \text{(Eq. 15)}$$

In this way, optimization of the objective function can result in optimization (e.g., minimization) both the waterside and airside objective functions in tandem. As described above, J is shown as the minimization of the summation of waterside objective function $F^{WS}$ and airside objective function $F^{AS}$ for sake of example. As other examples, J may be the maximization of the summation of $F^{WS}$ and $F^{AS}$, minimization of a difference between $F^{WS}$ and $F^{AS}$, etc.

Still referring to FIG. 6, optimization module 422 is shown to include a symmetry removal module 612. Symmetry removal module 612 can be configured to remove symmetry in the objective function determined/generated by optimization framework module 602 to simplify the optimization process.

If multiple generators have identical models (e.g., the coefficients of interpolation points $\zeta_{jknt}$ are the same), the predictive model of the optimization may possess a high degree of symmetry. For example, if generators $j_1$ and $j_2$ are identical, equivalent solutions can be obtained by swapping all variables with subscripts $j_1$ and $j_2$. Additionally, if both generators are switched on in the same time step, both loadings can be switched without affecting feasibility or the value of the objective function. Thus, there are potentially $2^{|T|}$ equivalent symmetric solutions. Equivalent symmetric solutions can significantly slow the branch-and-bound process as multiple symmetric fractional solutions may need to be pruned before any progress can be made. To avoid the computational burden of equivalent symmetric solutions, reformulation of the predictive model may be necessary to remove the symmetry. As such, symmetry removal module 612 can reformulate the predictive model such that for any given schedule in which identical units are indistinguishable, there is only one solution to the predictive model that corresponds to that schedule.

To help remove the symmetry, symmetry removal module 612 can impose an ordering on the identical generators in the predictive model. In this case, $l \in L$ can denote groups of identical generators and $J_l$ can be an index of generators within each group. Without loss of generality, each $J_l$ may include consecutive integers (i.e., indices of identical generators are grouped). Further, symmetry removal module 612 can add a continuous variable $R_{jt}$ to compute the part-load of each generator according to the following equation:

$$R_{jt} = \sum_{m \in M_j} \sum_{n \in N_{jm}} \xi_{jnt} Z_{jmnt}, j \in J, t \in T \quad \text{(Eq. 16)}$$

The above equation can calculate $R_{jt}$ using piecewise-linear interpolation as in Eq. 1. The interpolation points $\xi_{jnt}$ can define any part-load relationship, but may typically define the fractional load for a specific resource (e.g., for a chiller with minimum cooling capacity of 5 MW and a maximum of 10 MW where $\xi_{jnt}$ would range from 0.5 to 1).

Symmetry removal module 612 can further order the generators based on the following:

$$R_{jt} \geq R_{(j+1),t}, j \in J_l, j \neq \max(J_l), l \in L, t \in T \quad \text{(Eq. 17)}$$

For example, if $L_j = \{1,2,3\}$, then the above constraints may require Generator 1 to have the highest loading, followed by Generator 2, followed by Generator 3. It should be noted that, because of the reordering, the switching constraints described in detail above in Eqs. 4-6 should be rewritten in terms of these groups as follows:

$$\sum_{j \in J_l} (U_{jt} - U_{j(t-1)}) = U_{lt}^+ - U_{lt}^-, l \in L, t \in T \quad \text{(Eq. 4')}$$

$$\sum_{j \in J_l} U_{jt} \geq \sum_{t'=0}^{\delta_l - 1^+} U_{l(t-t')}^-, l \in L, t \in T \quad \text{(Eq. 5')}$$

$$\sum_{j \in J_l} (1 - U_{jt}) \geq \sum_{t'=0}^{\delta_l - 1^-} U_{l(t-t')}^-, l \in L, t \in T \quad \text{(Eq. 6')}$$

where $U_{lt}^+$ and $U_{lt}^-$ are integer values instead of binary values. The above modified switching constraints may require that the number of generators from group l that are on is at least as many as the number that have been switched on in the last $\delta_l^+$ time steps. Similar logic can be applied to switched off generators. It should be noted that the same ordering need not be imposed on the actual equipment, as the generators in the predictive model can be mapped to different generators in the plant if it comes time to dispatch the decisions. The above ordering can be referred to as the "ordered" formulation, as it imposes an ordering on the identical generators to break symmetry.

One benefit of calculating the individual generator part loads is that additional constraints or penalties can be placed on switching. For example, generators can be restricted to changing no more than 25% of total part load in consecutive time steps. Further, individual rate-of-change penalties can be added to the objective function by symmetry removal module 612. However, the addition of variables and constraints may affect the solution process. As such, it may be desirable to have an alternative reformulation without adding any extra variables. The alternative formulation can be designed such that generators $j \in J$ is repurposed to denote the unique type of generator and $U_{jt}$ can be redefined to denote the integer number of generators of type j that are on at a current time step. For this change, symmetry removal module 612 can modify the third on/off switching constraint defined above in Eq. 6 as:

$$\mu_j - U_{jt} \geq \Sigma_{t'=0}^{\delta_j - 1^-} U_{j(t-t')}^-, j \in J, t \in T \qquad (\text{Eq. 6''})$$

Further, symmetry removal module 612 can change the auxiliary variables $V_{jmt}$ to be integer values. These changes can allow constraints defined in Eqs. 1-3 to calculate the sum of $U_{jt}$ points to be calculated on the piecewise-linear performance curve, rather than just selecting a single point. Said formulation is compact in that it reduces the total number of variables which can be computationally advantageous to the binary ordering constraints. It should be appreciated that even though binary variables are substituted for integer variables, the reduction in the total number of variables may nonetheless result in processing improvements.

However, with said formulation it may not be possible to add individual rate-of-change penalties, as $Q_{jkt}$ can represent the total production by all type j generators, and the individual loadings may not be known. This formulation may be referred to herein as the "integral" formulation, as the formulation removes symmetry by replacing identical binary variables with their integer-valued sum. It should be noted that in cases where identical generators happen to be at the same operating point does not cause issues in the optimization and such solutions may not be eliminated by either symmetry removal strategy performed by symmetry removal module 612. Based on the symmetry removal, optimizer module 618, as described in detail below, can solve the simplified optimization problem.

Still referring to FIG. 6, optimization module 422 is shown to include a decomposition module 614. Decomposition module 614 can decompose the optimization problem into manageable subproblems for computational efficiency. In particular, for systems with a large number of zones or with a long prediction horizon, the composite optimization problem may become very large and may become difficult and/or impossible to solve or find a feasible solution given real-time computational requirements. As such, decomposition module 614 can perform one or more decompositions to simplify the optimization problem. Advantageously, as coupling between the airside and waterside systems only occurs in a single constraint as described above, the decomposition can be straightforward. In some embodiments, decomposition module 614 performs a Lagrangian decomposition and/or a hierarchical decomposition as described in detail below. However, it should be appreciated that the Lagrangian decomposition and the hierarchical decomposition are provided as examples. Decomposition module 614 can perform any appropriate decomposition process to simplify the optimization problem.

In some embodiments, decomposition module 614 performs a Lagrangian decomposition. Based on a structure of the predictive model of the optimization problem, the airside constraints may be irrelevant if the primary demand variables $G_{ikt}$ are fixed (and the resulting zone temperature $T_{it}$ is feasible). As such, decomposition module 614 can define the estimated forecast of secondary resource demand $\tilde{\phi}_{kt}$ as:

$$\tilde{\phi}_{kt} := \phi_{kt} + \sum_{i \in I} G_{ikt} \qquad (\text{Eq. 18})$$

Based on $\tilde{\phi}_{kt}$, the coupling constraint can be defined as:

$$\sum_{j \in J} Q_{jkt} + Y_{kt} + P_{kt} + B_{kt} \geq \tilde{\phi}_{kt}, k \in K, t \in T \qquad (\text{Eq. 19})$$

such that the airside objective function $F^{AS}$ becomes fixed. In this way, a primal waterside subproblem can be defined by decomposition module 614 based on the constraints defined in Eqs. 1-7, 9, and 19 as well as the objective function defined in Eq. 8.

The corresponding primal airside subproblem can be defined by decomposition module 614 by the constraints defined in Eqs. 10-12 with the objective function defined in Eq. 13. However, as primary demand $G_{ikt}$ is fixed in this case, the primal airside subproblem may amount to a feasibility problem.

As an alternative to fixing the variables $G_{ikt}$, the variables can be relaxed by decomposition module 614 in a Lagrangian sense. To start, decomposition module 614 can make two copies of primary demand $G_{ikt}$: $G_{ikt}^{WS}$ for the waterside system and $G_{ikt}^{AS}$ for the airside system. In an exact predictive model, a constraint may be set such that $G_{ikt}^{WS} = G_{ikt}^{AS}$. However, to decompose the optimization problem, said constraint can be relaxed by moving the constraint to the objective function as a term given by the following:

$$\sum_{i,k,t} \lambda_{ikt} (G_{ikt}^{AS} - G_{ikt}^{WS}) \qquad (\text{Eq. 20})$$

where $\lambda_{ikt}$ is a chosen set of multipliers. In this way, the exact Lagrangian decomposition can be given by the following:

$$\min_{\substack{\text{Airside} \\ + \\ \text{Waterside}}} \left( \max_{\lambda_{ikt}} \left( F^{WS} + F^{AS} + \sum_{i,k,t} \lambda_{ikt} (G_{ikt}^{AS} - G_{ikt}^{WS}) \right) \right) \qquad (\text{Eq. 21})$$

with all of the constraints on the full predictive model and where $\Sigma_{i,k,t} \lambda_{ikt} (G_{ikt}^{AS} - G_{ikt}^{WS})$ is a penalty cost.

By taking dual to interchange the order of optimization, the decomposition can be given by:

$$\max_{\lambda_{ikt}} \left( \min_{\text{Airside}} \left( F^{AS} + \sum_{i,k,t} \lambda_{ikt} G_{ikt}^{AS} \right) + \min_{\text{Waterside}} \left( F^{WS} - \sum_{i,k,t} \lambda_{ikt} G_{ikt}^{WS} \right) \right) \qquad (\text{Eq. 22})$$

which, for a fixed value of multipliers $\lambda_{ikt}$, can be solved as two independent subproblems, referred to herein as the dual airside and waterside subproblems. Specifically, the dual airside subproblem can be given by:

$$\min_{Airside}\left(F^{AS} + \sum_{i,k,t} \lambda_{ikt} G_{ikt}^{AS}\right) \quad (Eq.\ 23)$$

and the dual waterside subproblem can be given by:

$$\min_{Waterside}\left(F^{WS} - \sum_{i,k,t} \lambda_{ikt} G_{ikt}^{WS}\right) \quad (Eq.\ 24)$$

In this case, constraints for the dual airside and waterside subproblems can be the same as the constraints on the full predictive model. Further, $\sum_{i,k,t}\lambda_{ikt}G_{ikt}^{AS}$ and $\sum_{i,k,t}\lambda_{ikt}G_{ikt}^{WS}$ can act as and penalties on the dual airside subproblem and the dual waterside subproblem, respectively. It should be appreciated that near-optimal solutions to the original problem can be obtained using subgradient methods applied to multipliers $\lambda_{ikt}$ as described in detail below.

As described herein, a dual subproblem and a primal subproblem are components of a larger optimization problem. In some embodiments, a solution to the dual subproblem provides a lower bound on a solution to the primal subproblem. Solutions to the dual subproblem and the primal subproblem need not necessarily be equal, however the solution to the primal subproblem cannot fall below the solution to the dual subproblem. A difference between the solutions to the dual subproblem and the primal subproblem can be referred to as a duality gap.

Decomposition module 614 can make initial estimations regarding multipliers $\lambda_{ikt}$. For systems with large active storage capacity, a constant estimation may perform well (e.g., as the storage tanks can effectively smooth the cost of chilled water). For systems without significant active storage, resealed utility prices $\rho_{kt}$ may perform better as the production cost can be time-varying. It should be noted that the airside dual subproblem may be scale-invariant as the only terms in the objective function is the dual penalty. However, for the waterside subproblem, the scaling may be significant and it may be necessary to rescale the initial multiplier estimation before proceeding. For example, Lagrangian programming relaxation could be solved, and said multipliers can be used to obtain suitable scaling and/or simply used directly as $\lambda_{ikt}$.

After determining an appropriately scaled initial estimation, decomposition module 614 and/or optimizer module 618 can solve both dual subproblems. A result of solving the dual subproblems be a lower bound for the combined primal optimization problem, but the solution may not be feasible (e.g., it is likely that $G_{ikt}^{AS} \neq G_{ikt}^{WS}$). To obtain a feasible solution, decomposition module 614 can use $G_{ikt}^{AS}$ to calculate $\phi_{kt}$ as shown in Eq. 18 above and can solve the primal waterside subproblem. The combined solution from the dual airside and primal waterside subproblems may be feasible (although may be poor quality if the waterside slack variables $B_{kt}$ are nonzero) and can give an upper bound on the overall objective function. The multipliers $\lambda_{ikt}$ can be updated in the direction of $G_{ikt}^{AS} - G_{ikt}^{WS}$ using a predetermined step size $\mu$, and the process can be repeated. For example, multipliers $\lambda_{ikt}$ may be updated based on the following equation:

$$\lambda_{ikt} := \lambda_{ikt} + \mu(G_{ikt}^{AS} - G_{ikt}^{WS}) \quad (Eq.\ 25)$$

such that the multipliers $\lambda_{ikt}$ are updated dependent on whether $G_{ikt}^{AS} - G_{ikt}^{WS}$ is positive or negative. After a sufficient amount of progress is made, the solutions can be accepted and the process can be repeated at a next time step, shifting the current multipliers forward in time to use as the next initial estimation. In this case, shifting the multipliers can be given by the following equation:

$$\lambda_{ikt} := \lambda_{ik(t-1)} \quad (Eq.\ 26)$$

A process for performing the Lagrangian decomposition is described in detail below with reference to FIG. 8.

Choosing an appropriate step size $\mu$ can be important for accuracy of the optimization. In some embodiments, the step size $\mu$ is chosen such that the step size $\mu$ is proportional to an estimated optimality gap. In this case, a prefactor can be adjusted to $1/\sum_{i,k,t}(G_{ikt}^{AS} - G_{ikt}^{WS})^2$ at each iteration. In some embodiments, the step size $\mu$ is chosen based on a geometric method such that the step size $\mu$ is proportional to $\rho^n$ where $\rho \in (0,1)$ and n is an iteration number. In some embodiments, the step size $\mu$ is chosen based on a harmonic method such that the step size $\mu$ is proportional to $1/n$. In some embodiments, the step size $\mu$ is chosen based on a different appropriate method. In the geometric and harmonic methods, the prefactor may be constant and may be determined by trial and error. In certain conditions, all three methods may provide convergence to an optimal dual solution. However, because the optimization is nonconvex, the objective of the optimal dual solution may not necessarily be that of the optimal primal solution. In other words, the optimal duality gap may be nonzero. As such, although a small duality gap (e.g., 1%, 2%, etc.) may be desirable, such a bound may not be attainable. In this case, slightly larger duality gaps (e.g., 5%, 6%, etc.) may be a reasonable target, but it should be appreciated that attainable values may vary significantly based on optimization problem parameters. In some embodiments, online termination criteria is set based on available computation time or as a fixed number of iterations.

In some embodiments, decomposition module 614 performs a hierarchical decomposition. Decomposition module 614 may perform the hierarchical decomposition as an alternative to and/or in addition to the Lagrangian decomposition described above. The hierarchical decomposition can include separating the airside and waterside problems by utilizing a simplified representation of the waterside equipment selection problem. By solving a series of single-period optimization problems for varying total heating and cooling loads, it may be possible to determine the optimal resource production/consumption relationships for the central plant. More specifically, in the hierarchical decomposition, multiple discrete optimizations can be performed for each combination of heating and cooling loads. Results of said discrete optimizations can describe an amount of waterside resource consumption resulting from each combination of heating and cooling loads. The results can thereby be used to generate an aggregate waterside model that defines a relationship between required loads and resulting resource consumption.

In some embodiments, decomposition module 614 defines each equipment selection subproblem with the following form:

$$\min \sum_{k \in K} \rho_k P_k \quad (Eq.\ 27)$$

such that:

$$\sum_{j \in J} Q_{jk} + P_k \geq \phi_k, k \in K \qquad \text{(Eq. 28)}$$

$$Q_{jk} = \sum_{m \in M_j} \sum_{n \in N_{jm}} \zeta_{jkn} Z_{jmn}, j \in J, k \in K \qquad \text{(Eq. 29)}$$

$$\sum_{m \in M_j} V_{jm} = U_j, j \in J \qquad \text{(Eq. 30)}$$

$$\sum_{n \in N_{jm}} Z_{jmn} = V_{jm}, j \in J, m \in M_j \qquad \text{(Eq. 31)}$$

which may assume that time-invariant representative values can be chosen for resource costs $\rho_k$ and equipment models $\zeta_{jkn}$.

To construct an aggregate representation, decomposition module 614 can define the following sets:

$$K^+ := \{k \in K : \phi_{kt} > 0 \text{ or } \Gamma_{ikt} > 0 \text{ for some } t \in T \text{ or } i \in I\},$$

$$K^- := \{k \in K : \Pi_k > 0\}$$

In this way, subsets of resources that are exported from and purchased by the central plant can be defined. For each type of major equipment that produces resources in $K^+$, a representative resource $k^* \in K^+$ can be chosen and Eq. 27 can be solved with $\phi_{k^*}$ varying from zero to a maximum total capacity for the type of unit. It should be noted that other types of major equipment may be excluded, but all other auxiliary equipment (i.e., equipment that does not produce resources in $K^+$) are retained. Based on the values, a single operating curve $\tilde{\zeta}_{kn}$ can be constructed to represent overall behavior of the given type of equipment. Operating curve $\tilde{\zeta}_{kn}$ can be constructed accounting for resources in $K^+$ that are produced by the major equipment as well as resources $K^-$ that can be consumed by the major and auxiliary equipment. To reduce computation burden on HVAC controller 402, said curves can be chosen to be fully linear (i.e., $N = \{1,2\}$ with $\tilde{\zeta}_{k1} = 0$ and $\tilde{\zeta}_{k2}$ giving values at the maximum capacity), although, depending on equipment characteristics, piecewise-linear curves may be necessary. In either case, said curves need only include resources in $K^+ \cup K^-$ as the remaining internal resources can be accounted for in Eq. 27 defined by decomposition module 614.

With the aggregate representations $\tilde{\zeta}$ of the central plant, the online problem can be split into two pieces. A first piece can include a centralized subproblem in which the full airside model is optimized with the approximate aggregate waterside models. A second piece can include the (primal) waterside subproblem in which the full waterside model is optimized assuming the airside demand is fixed to its optimal value from the centralized subproblem. Specifically, the centralized subproblem may be a modified version of the original formulation that removes switching between the constraints defined in Eqs. 4-6. Further, the centralized subproblem can fix the variables $U_{jt}$ to 1 and can use the approximate curves $\tilde{\zeta}$ (with the appropriately adjusted sets J, M, and N).

As a result of solving the centralized subproblem, the total demand $\hat{\phi}_{kt}$ can be calculated by decomposition module 614 via Eq. 18. In this case, decomposition module 614 can solve the waterside subproblem as in the Lagrangian decomposition described above. If the equipment models are time-varying, the approximate curves $\tilde{\zeta}$ can be updated as appropriate for the next time step. As described above, the hierarchical decomposition can be performed as an alternative to and/or in addition to the Lagrangian decomposition described above. In some embodiments, in the hierarchical strategy, the centralized and waterside primal subproblems are solved in series as compared to the in the Lagrangian decomposition where all subproblems can be solved in parallel. In some embodiments, the process performed by decomposition module 614 as associated with the hierarchical decomposition is described in greater detail below with reference to FIG. 9.

One advantage of this approach may be that no iteration is required between the subproblems. Rather, at each time step, a single centralized subproblem can be solved by decomposition module 614 and followed by a single primal waterside subproblem. Said process may result in computation times that are more predictable. Further, the lack of iteration may avoid a need to select a step size formula. If a lower bound estimate is desired, the dual problem can be solved by decomposition module 614 using the multipliers from the demand satisfaction constraint defined in Eq. 14. However, there may be no way to make progress via additional iterations, and the bound may be poor. An additional advantage is that this strategy is easier to initialize, as no guess for multipliers is required as in the Lagrangian decomposition. The hierarchical strategy may not be preferable in cases where fully linear aggregate curves $\tilde{\zeta}$ are not sufficient, as the centralized problem may include discrete variables for the piecewise-linear models. If the aggregate curves $\tilde{\zeta}$ are convex, then the formulation is may be relatively tight, and it still may be possible to find a global solution. However, if the aggregate curves $\tilde{\zeta}$ are nonconvex, then the centralized problem may be difficult to solve.

Optimization module 422 is also shown to include a surrogate model module 616.

Surrogate model module 616 can be configured to generate approximate surrogate models for the optimization problem. The reformulations and decomposition strategies performed by symmetry removal module 612, decomposition module 614, and/or other components of optimization module 422 allow optimization module 422 to find suboptimal solutions to large instances in real-time (e.g., with MILP solvers). However, it may nonetheless be desirable to reduce computation times further. For example, if a less powerful solver is used or if solution times for some instances approach an upper limit of available time, employing a shorter time horizon can decrease the computational burden.

By itself, a shorter horizon may lead to a myopic schedule (e.g., not fully utilizing available storage due to not planning ahead far enough into the future). However, because decisions made at the end of the schedule may never be actually implemented (as they are re-optimized at later time steps), it may not be necessary that later decisions are optimized in full detail. To this end, surrogate model module 616 can make simplifications to the full MILP model that reduce a level of detail for individual equipment scheduling while still capturing important long-time behavior of the system. A surrogate model defined/generated by surrogate model module 616 can therefore be used to approximate the latter stages of the optimization problem so that the horizon of the full model can be reduced, thereby leading to computational improvements without jeopardizing the system (e.g., without underutilization of storage tanks).

As a part of defining the surrogate model, surrogate model module 616 can remove the on/off variables $U_{jt}$ as well as the switching variables $U_{jt}^+$ and $U_{jt}^-$ (i.e., the number of generators switched on or off) from the optimization problem. In some embodiments, surrogate model module 616 also removes the switching constraints defined in Eqs. 4-6 from the optimization problem. Further, surrogate model module 616 can remove the variables $V_{jmt}$ (i.e., the number of units operating in each interpolation region) as well as the constraint defined in Eq. 2.

In some embodiments, surrogate model module 616 replaces the constraint defined in Eq. 3 with the following new constraint:

$$\sum_{n \in N_{jm}} Z_{jmnt} = 1, j \in J, m \in M_j, t \in T \quad \text{(Eq. 3''')}$$

which further simplifies the optimization problem. In some embodiments, surrogate model module 616 defines a constraint that requires that $M_j$ includes only a single interpolation region that includes the origin (i.e., so that generator j can be completely shut off).

Other simplifications imposed to surrogate models generated by surrogate model module 616 may include, for example, utilizing longer time steps, reducing a number of variables (e.g., input variables) considered, simplifying values predicted by the surrogate models (e.g., using strictly integer values as opposed to decimal values), etc. As should be appreciated, a variety of simplifications can be imposed on the surrogate models dependent on what level of increase in processing efficiency is desired.

The simplifications defined above by surrogate model module 616 may ignore discrete switching requirements and replace the (likely nonconvex) piecewise-linear generator models with linear approximations. In this way, the simplifications may be similar to the simplifications associated with the centralized subproblem in the hierarchical decomposition defined by decomposition module 614. However, in this case, equipment may still be modeled individually as opposed to being modeled as an aggregate group.

For the airside model, all of the variables are continuous. As such, there may be nothing to simplify with respect to discrete variables. However, if the number of temperature zones I is large, the necessary dynamic model $\alpha_{ii'}$, $\omega_{ii'k}$, $\theta_{it}$ may be large. Because these dynamic effects are relevant on smaller timescales, the dynamic effects can be simplified for the surrogate model defined by surrogate model module 616. For example, zones that are adjacent or strongly coupled can be aggregated into a single larger temperature zone with a single uniform temperature $T_{it}$ and aggregate resource usage $G_{ikt}$. In some embodiments, the end result in this case is to reduce a number of zones such that a size of the airside model is also reduced.

In some embodiments, a goal of the surrogate model defined by surrogate model module 616 is to capture long-term storage tank dynamics (e.g., on timescales of a week) while ignoring short-term equipment switching considerations (e.g., on the timescale of a few hours) and airside dynamics (e.g., on timescales of tens of minutes). The biggest loss in terms of model accuracy may be the production/consumption characteristics of the generators. However, if the linear approximation is made near the typical operating point, predictions of resource consumption may likely be of acceptable accuracy. Such operating points can be determined by solving the full model using average values of parameters and determining average operating levels for each piece of equipment. As demand characteristics change (e.g., over the course of a year), the operating points may be required to be updated (e.g., by repeating the process using more representative demand) to ensure accurate predictions. For the airside, the most important prediction may be overall heating/cooling load. Thus, over long timescales, details of the inter-zone and intra-zone dynamics can be safely ignored by the dynamic model. As such, while a final cost estimate of the surrogate model may not be extremely accurate, the predicted trajectory of the storage tank may nonetheless be near-optimal. Advantageously, the predicted trajectory can be used by optimization module 422 to inform the fully detailed model over a shorter horizon.

Because the surrogate model can be solved in a much shorter amount of time as compared to the full optimization problem, the surrogate model can be used online with a long horizon to derive terminal constraints to use for the full optimization model. In MPC, terminal constraints can be enforced on states of the dynamic model to adjust behavior at an end of the prediction horizon. Said modification may provide recursive feasibility and can serve as an approximation of an infinite-horizon problem. In some embodiments, terminal constraints are used for a similar purpose of approximating an initial section of a long-horizon solution without having to form or solve the longer optimization problem. In this case, the main dynamic variables can include the charge of the storage tank $S_{kt}$, the zone temperatures $T_{it}$ as modeled in Eq. 10, and the peak purchase $P_k^{max}$ as computed in Eq. 9.

It should be noted that the switching constraints defined above in Eqs. 4-6 may lead to temporal coupling, but can be ignored in the surrogate model. Thus, after solving the surrogate model over a long horizon, values of $S_{kt}$, $T_{it}$, and $P_k^{max}$ at an intermediate time step can be used as a terminal constraint for a shorter-horizon full optimization problem.

In this case, the usage may be different to terminal constraints in MPC as the constraints are updated at each time step based on results of the surrogate model. Thus, provided the surrogate model is reasonably accurate, there may be little to no reduction in the feasible space for the full model. Alternatively, instead of splitting into two separate optimization problems, a "hybrid" model can be used which uses the full model for a first part of the horizon and switches to the surrogate model for a remainder of the horizon. In this way, infeasibility due to tight terminal constraints can be avoided, but the resulting optimization problem may still be challenging to solve due to a larger number of continuous variables. In either case, longer-timescale effects in the storage tank and the demand charge can be approximated and accounted for without requiring the full complexity of the central plant. Said two methods are illustrated in greater detail below with reference to FIGS. 7A-7C.

Optimization module 422 is also shown to include an optimizer module 618. Optimizer module 618 can perform an optimization of the optimization problem generated by optimization framework module 602 and/or as augmented by other components of optimization module 422 (e.g., symmetry removal module 612, decomposition module 614, surrogate model module 616, etc.). Further, optimizer module 618 can perform the optimization respective of any constraints placed on the optimization.

In some embodiments, optimizer module 618 performs a linear optimization using any of a variety of linear optimization techniques to solve the optimization problem. For example, optimizer module 618 may use a mixed integer linear programming approach to perform the optimization. As other examples, optimizer module 618 may employ exchange algorithms (e.g., simplex, crisscross, etc.), interior point algorithms (e.g., ellipsoid, projective, path-following, etc.), covering and packing algorithms, integer programming algorithms (e.g., cutting-plant, branch and bound, branch and cut, branch and price, etc.), or any other type of linear optimization algorithm or technique to solve the optimization problem subject to the optimization constraints.

As a result of the optimization, optimizer module 618 can determine/identify optimal values for decision variables. In this way, optimizer module 618 can determine values to operate building equipment (e.g., equipment 412 and equipment 414 as described with reference to FIG. 4) based on. For example, as a result of the optimization, optimizer module 618 may determine an amount of each resource purchased from utilities 418, a net production rate of each resource by generators 502, an amount of each resource drawn from storage or supplied to storage, a net storage of each resource, an amount of each resource backlogged, a rate of change for the backlogged amount of each resource, and/or other variables related to resource consumption, resource production, resource storage, or resource purchases. Optimizer module 618 may also optimize the temperatures of the building zones and the flows of each resource into the building zones. Optimizer module 618 may determine optimal binary on/off states for each of generators 502, a number of generators 502 turned on/off during each time step, and the load ratio or operating setpoint for each of generators 502. Optimizer module 618 may select an operating region along the performance curves for each of generators 502 and use the selected operating region to determine the on/off states and load ratios for generators 502.

In some embodiments, optimizer module 618 performs a nonlinear optimization separate and/or in addition to the linear optimization described above. In some embodiments, the nonlinear optimization performed by optimizer module 618 is used to adjust for inaccuracies in the linear optimization (e.g., due to inaccuracies in the linearization of nonlinear performance curves). Optimizer module 618 may receive equipment on/off states and load ratios based on the linear optimization. Optimizer module 618 may also receive the resource production rates and temperatures determined based on the linear optimization. Optimizer module 618 may refine the equipment on/off states, load ratios, resource production rates, and/or temperatures in order to optimize the instantaneous resource consumption rates at each time step in the optimization period.

In some embodiments, optimizer module 618 refines the equipment on/off and operating setpoints using binary optimization and quadratic compensation. Binary optimization may minimize a cost function representing the resource consumption of an equipment group or subplant to produce a given load. In some embodiments, non-exhaustive (i.e., not all potential combinations of devices are considered) binary optimization is used. Quadratic compensation may be used for equipment whose resource consumption is quadratic (or otherwise not linear). Optimizer module 618 may also determine optimum operating setpoints for equipment using nonlinear optimization. Nonlinear optimization may identify operating setpoints that further minimize the objective function. In some embodiments, the nonlinear optimization performed by optimizer module 618 is the same or similar to the low level optimization process described in U.S. patent application Ser. No. 14/634,615 titled "Low Level Central Plant Optimization" filed Feb. 27, 2015. The entire disclosure of U.S. patent application Ser. No. 14/634, 615 is incorporated by reference herein.

In some embodiments, optimizer module 618 adjusts the equipment on/off decisions and operating setpoints based on the capacities of generators 502 and to satisfy energy and mass balances. Optimizer module 618 may perform the nonlinear optimization without considering system dynamics. The optimization process may be slow enough to safely assume that the equipment control has reached its steady-state. Thus, optimizer module 618 may determine the optimal control decisions at an instance of time rather than over a long horizon. Optimizer module 618 may provide the on/off decisions and setpoints to waterside system 200 and airside system 300 for use in controlling equipment 412-414. In some embodiments, optimization techniques that can be used by optimizer module 618 are described in U.S. patent application Ser. No. 14/694,633, filed Apr. 23, 2015, incorporated herein by reference in its entirety.

Figure 7A:
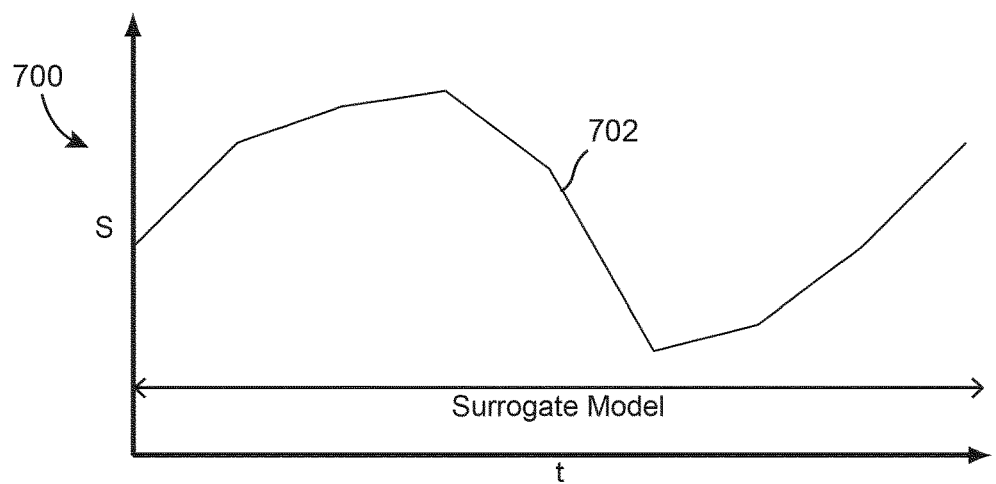
FIG. 7A is a graph illustrating an example of a trajectory generated based on a surrogate model, according to some embodiments.

Referring now to FIG. 7A, a graph 700 illustrating an example of a trajectory 702 generated based on a surrogate model is shown, according to some embodiments. As should be appreciated, trajectory 702 is shown as an example of a surrogate model trajectory and is not intended to be limiting in terms of trajectories that can be generated by surrogate models. Trajectory 702 can illustrate, for example, a setpoint (e.g., a temperature setpoint, a humidity setpoint, etc.) trajectory over time. As trajectory 702 can be generated by a surrogate model as opposed to a complete predictive model, trajectory 702 may be a more general approximation of an optimal trajectory over time. However, if the surrogate model is reasonably accurate, trajectory 702 may nonetheless be relatively accurate. In some embodiments, the surrogate model used to generate trajectory 702 is generated by surrogate model module 616 as described with reference to FIG. 6.

Figure 7B:
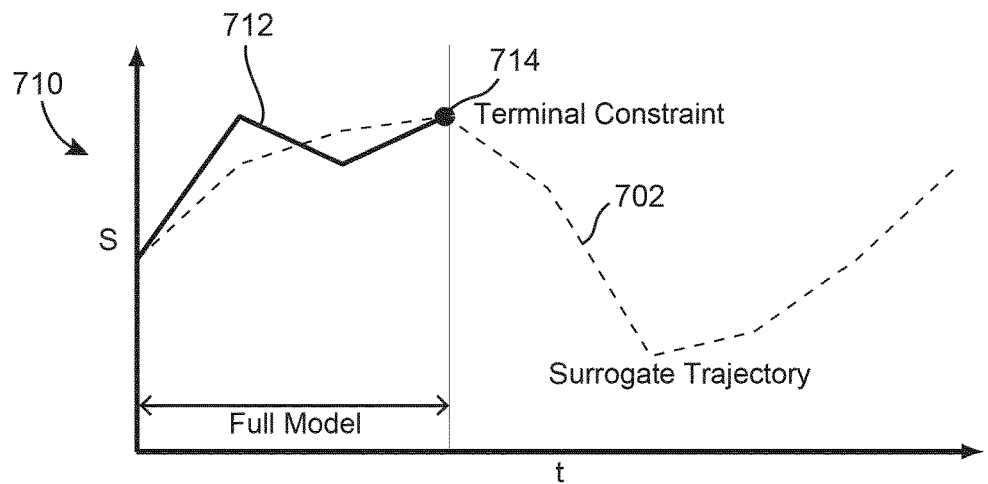
FIG. 7B is a graph illustrating an example of a trajectory generated based on a full predictive model, according to some embodiments.

Referring now to FIG. 7B, a graph 710 illustrating an example of a trajectory 712 generated based on a full predictive model is shown, according to some embodiments. As should be appreciated, similar to trajectory 702 described above with reference to FIG. 7A, trajectory 712 is shown as an example of a trajectory that may be generated based on optimization of a full predictive model and is not intended to be limiting in terms of trajectories that can be generated based on full predictive models. Graph 710 is also shown to include an end point 714 on trajectory 712. End point 714 can illustrate an end of an amount of time over which the full predictive model is optimized over. By incorporating end point 714, a prediction horizon of the full predictive model can be shortened to reduce computational expenditure related to optimizing the full predictive model. In some embodiments, end point 714 is implemented as various constraints on an optimization process performed for the full predictive model (e.g., by optimization module 422). For example, end point 714 may be implemented as a soft terminal constraint such as a state of storage.

Graph 710 is also shown to include trajectory 702 of graph 700 to illustrate how the surrogate model trajectory (i.e., trajectory 702) differs from the full predictive model trajectory (i.e., trajectory 712). As can be seen in graph 710, trajectory 702 is a decent approximation of trajectory 712. However, trajectory 712 may include more specific changes to the setpoint as the full predictive model may account for more variables, include more constraints, utilize shorter time steps, etc. as compared to the surrogate model. As such, trajectory 712 may be appropriate to utilize in the short-term whereas trajectory 702 may be more appropriate to determine setpoints at later time steps to reduce computational complexity.

Figure 7C:
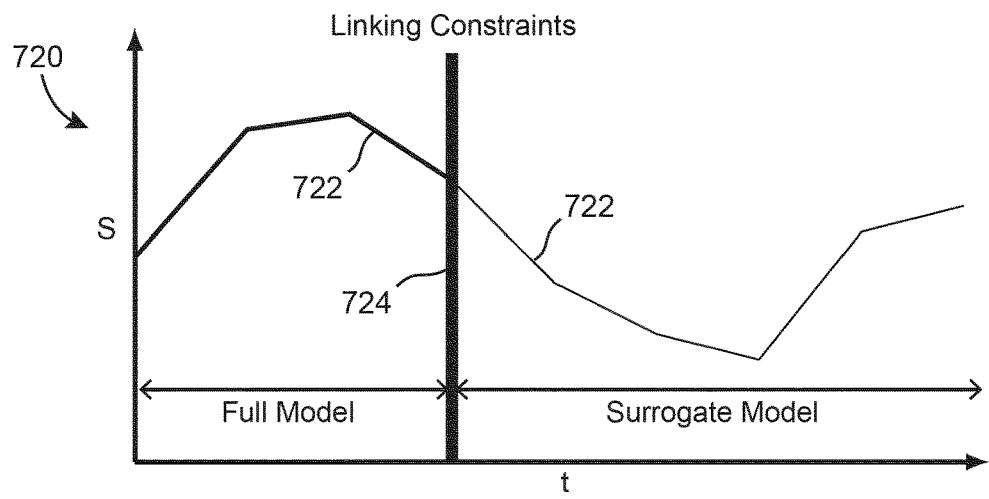
FIG. 7C is a graph illustrating a hybrid surrogate optimization strategy, according to some embodiments.

Referring now to FIG. 7C, a graph 720 illustrating a hybrid surrogate optimization strategy is shown, according to some embodiments. The hybrid surrogate optimization strategy can incorporate both a surrogate model and a full predictive model to generate a trajectory 722 over a time period. In this way, trajectory 722 can incorporate the accuracy of the full predictive model in the short-term and can benefit from reduced computational complexity associated with the surrogate model. Specifically, the full predictive model can be used for a first period of time whereas the surrogate model can be used for a second period of time over an optimization period. In this way, a solution to the overall optimization problem can be calculated in real-time.

In generating trajectory 722, optimization module 422 can identify and utilize linking constraints 724 to bridge the gap between the full predictive model and the surrogate model. For example, linking constraints 724 can include results of the optimization performed based on the full predictive model that are used as constraints on the surrogate model. As such, the optimization of the surrogate model can effectively "start off" where optimization of the full predictive model ended. Without linking constraints 724, a first setpoint generated based on the surrogate model may not be the same as a last setpoint generated based on the full predictive model, thereby breaking continuity of trajectory 722.

Figure 8:
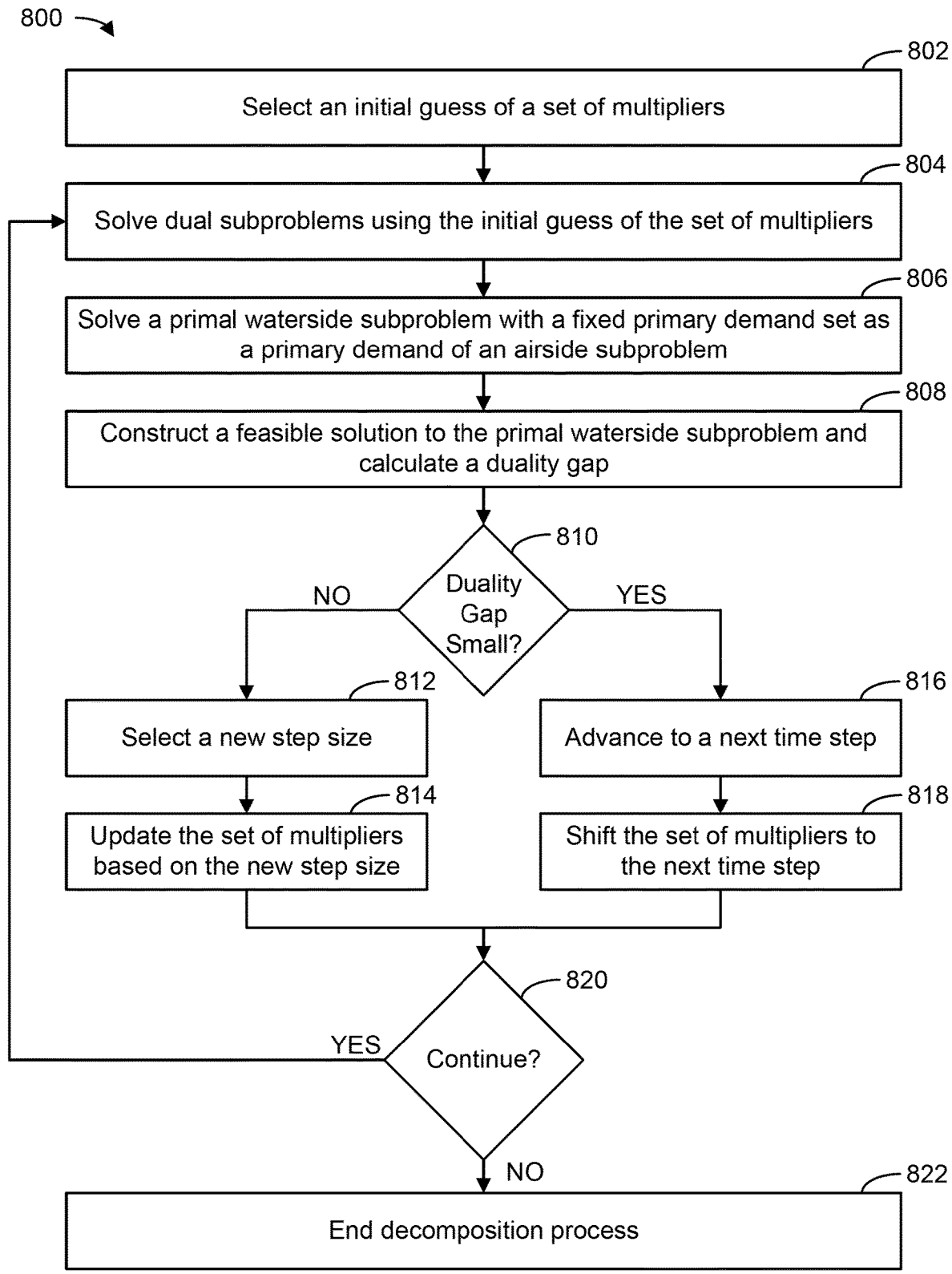
FIG. 8 is a flow diagram of a process for performing a Lagrangian decomposition, according to some embodiments.

Referring now to FIG. 8, a flow diagram of a process 800 for performing a Lagrangian decomposition is shown, according to some embodiments. The Lagrangian decomposition of process 800 can be used to be used to decompose an optimization problem into more manageable subproblems. Specifically, the optimization problem may be decomposed into an airside subproblem and a waterside subproblem. In some embodiments, the variables described below are the same as those defined above particularly with reference to FIG. 6. In some embodiments, steps of process 800 are performed by decomposition module 614 and/or other components of optimization module 422.

Process 800 is shown to include selecting an initial guess of a set of multipliers (step 802). The initial guess (estimate) of the set of multipliers can be defined in step 802 as $\lambda_{ikt}$. For systems with large active storage capacity, a constant estimation may perform well (e.g., as the storage tanks can effectively smooth the cost of chilled water). For systems without significant active storage, resealed utility prices $\rho_{kt}$ may perform better as the production cost can be time-varying. It should be noted that the airside dual subproblem may be scale-invariant as the only terms in the objective function is the dual penalty. However, for the waterside subproblem, the scaling may be significant and it may be necessary to rescale the initial multiplier estimation before proceeding. For example, the linear programming relaxation could be solved, and said multipliers can be used to obtain suitable scaling and/or simply used directly as $\lambda_{ikt}$. In some embodiments, step 802 is performed by decomposition module 614.

Process 800 is shown to include solving dual subproblems using the initial guess of the set of multipliers (step 804). A result of solving the dual subproblems be a lower bound for the combined primal optimization problem, but the solution may not be feasible (e.g., it is likely that $G_{ikt}^{AS} \neq G_{ikt}^{WS}$). In some embodiments, step 804 is performed by decomposition module 614 and/or optimizer module 618.

Process 800 is shown to include solving a primal waterside subproblem with a fixed primary demand set as a primary demand of an airside subproblem (step 806). To obtain a feasible solution, step 806 can include using $G_{ikt}^{AS}$ to calculate $\tilde{\phi}_{kt}$ and can include solving the primal waterside subproblem with the fixed primary demand. In other words, step 806 can include solving the primal waterside subproblem with fixed $G_{ikt} = G_{ikt}^{AS}$. In some embodiments, step 806 is performed by decomposition module 614 and/or optimizer module 618.

Process 800 is shown to include constructing a feasible solution to the primal waterside subproblem and calculating a duality gap (step 808). The combined solution from the dual airside and primal waterside subproblems may be feasible (although may be poor quality if the waterside slack variables $B_{kt}$ are nonzero) and can give an upper bound on an overall objective function. As such, step 808 may include combining the solutions of the dual airside and primal waterside subproblems as determined in steps 804 and 806. The duality gap can be calculated as a gap (e.g., a difference) between a solution to the optimal dual solution and the optimal primal solution. Under certain conditions, the duality gap may be zero if convergence to the optimal dual solution occurs. However, as the problem considered in process 800 is nonconvex, an objective of the dual solution may not necessarily equal an objective of the optimal primal solutions, thereby indicating that an optimal duality gap may be nonzero. In some embodiments, step 808 is performed by decomposition module 614.

Process 800 is shown to include determining whether a duality gap is small (step 810). A relative size of the duality gap to be considered small can be a predetermined value that may be based on problem parameters. For example, defining the duality gap as "small" may include determining whether a gap between a solution to the optimal dual solution and the optimal primal solution is less than or equal to 1%, less than or equal to 5%, etc., as determined based on the problem parameters. A required size of the duality gap in step 810 can be defined by a user, a system, a controller, etc. If the duality gap is determined to be sufficiently small (step 810, "YES"), process 800 can continue to step 816. If the duality gap is determined to not be sufficiently small (step 810, "NO"), process 800 can continue to step 812. In some embodiments, step 810 is performed by decomposition module 614.

Process 800 is shown to include selecting a new step size (step 812). If step 812 is performed, the duality gap may be too large (e.g., >1%, >5%, etc.). In this case, a new step size μ can be applied such that the Lagrangian decomposition for a current time step is modified. In selecting the new step size μ, step 812 may include applying a gap strategy, a geometric strategy, and/or a harmonic strategy as described above with reference to FIG. 6. If step 812 applies more than one strategy to calculate the new step size μ, step 812 may include performing a mathematical operation to calculate a final step size μ. For example, step 812 may include averaging the step sizes calculated by each strategy, determining a mean value, etc. In some embodiments, step 812 is performed by decomposition module 614.

Process 800 is shown to include updating the set of multipliers based on the new step size (step 814). In some embodiments, the set of multipliers is updated in step 814 based on Eq. 25, shown below:

$$\lambda_{ikt} := \lambda_{ikt} + \mu(G_{ikt}^{AS} - G_{ikt}^{WS}) \quad \text{(Eq. 25)}$$

where $\lambda_{ikt}$ is the set of multipliers, μ is the new step size determined in step 814, and $G_{ikt}^{AS}$ and $G_{ikt}^{WS}$ are the primary demand of the airside and waterside systems (e.g., by zone), respectively. In effect, the multipliers $\lambda_{ikt}$ can be updated in the direction of $G_{ikt}^{AS} - G_{ikt}^{WS}$ using the predetermined step size μ, such that process 800 can be repeated. In some embodiments, step 814 is performed by decomposition module 614.

Process 800 is shown to include advancing to a next time step (step 816). If step 816 is performed, the duality gap calculated in step 808 may be sufficiently small. As such, the solutions can be accepted as being feasible. As such, a new Lagrangian decomposition can be performed by advancing to the next time step. In some embodiments, step 816 is performed by decomposition module 614.

Process 800 is shown to include shifting the set of multipliers to the next time step (step 818). In some embodiments, the set of multipliers are shifted in step 818 based on Eq. 26, shown below:

$$\lambda_{ikt} := \lambda_{ik(t-1)} \qquad \text{(Eq. 26)}$$

where $\lambda_{ik(t-1)}$ is the set of multipliers from the previous time step (i.e., the time step of process 800 prior to performing step 816). By shifting the set of multipliers, a new Lagrangian decomposition can be prepared. In some embodiments, step 818 is performed by decomposition module 614.

Process 800 is shown to include a determination of whether to continue process 800 (step 820). In some embodiments, process 800 is required to end after some termination condition is fulfilled. For example, process 800 can be performed for a predefined amount of time or for a predefined number of iterations. If the termination condition is not met (step 820, "YES"), process 800 can repeat beginning at step 804. If the termination condition is met (step 820, "NO"), process 800 can proceed to step 822. In some embodiments, step 820 is performed by decomposition module 614.

Process 800 is shown to include ending the decomposition process (step 822). If step 822 is performed, the terminating condition of step 820 may be true. Accordingly, process 800 can terminate to end the decomposition process. In some embodiments, step 822 is performed by decomposition module 614.

In some embodiments, steps 804-822 of process 800 are performed online whereas step 802 can be performed online and/or offline. Selecting the initial estimate (guess) in step 802 can be performed online and/or offline as the initial estimate may not be specifically based on operation of equipment. For example, the estimate may be based on predefined estimates and therefore may not require direct feedback from equipment. However, steps 804-822 may be based on loads, utility prices, etc. In some embodiments, steps 820 and/or 822 can be performed online and/or offline.

Figure 9:
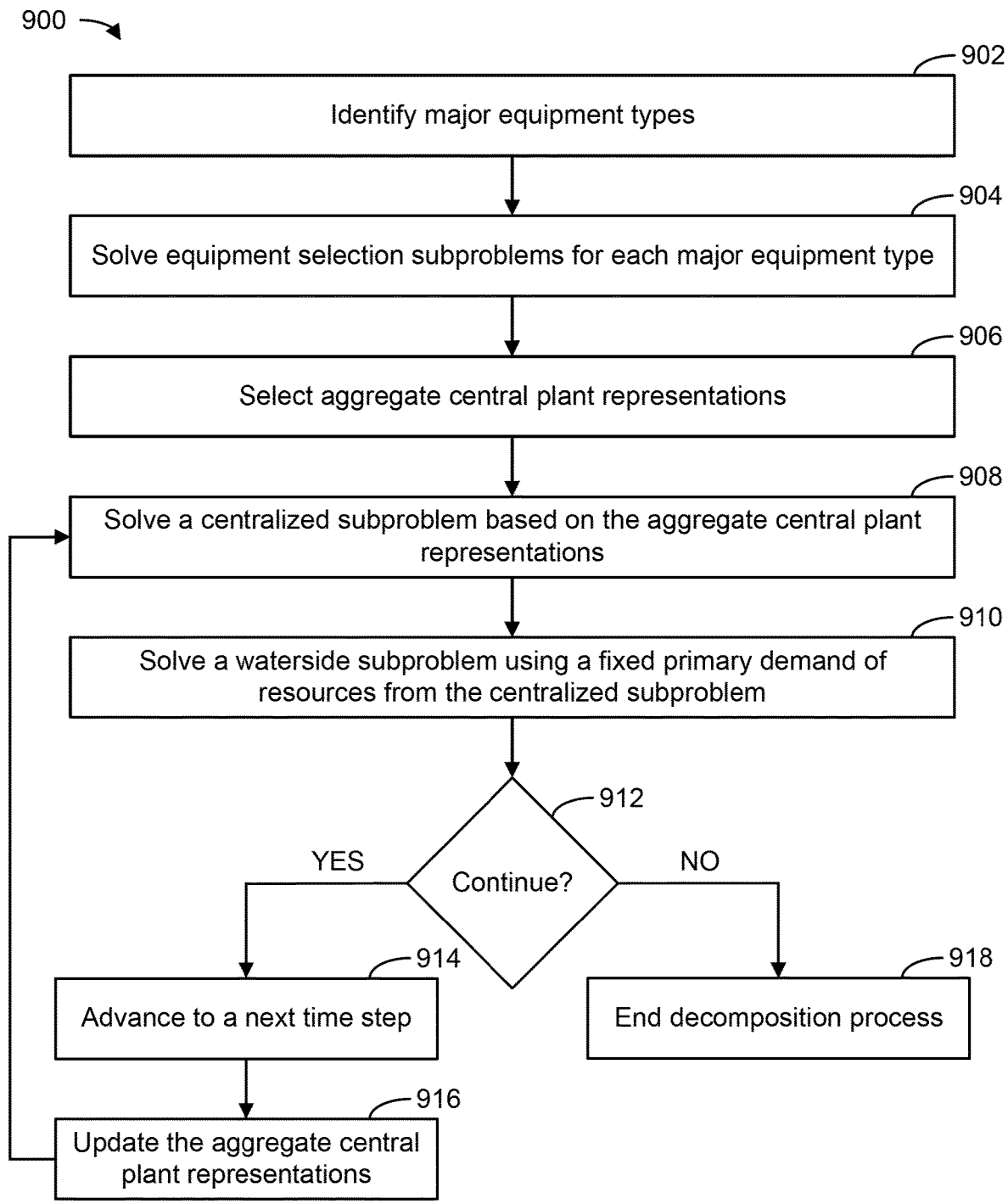
FIG. 9 is a flow diagram of a process for performing a hierarchical decomposition, according to some embodiments.

Referring now to FIG. 9, a flow diagram of a process 900 for performing a hierarchical decomposition is shown, according to some embodiments. Process 900 can illustrate an alternative to the Lagrangian decomposition process described with reference to FIG. 8. Accordingly, process 900 may be performed separately and/or in addition to process 800 of FIG. 8. It should be noted that steps 908-914 described below may constitute an online portion of process 900 whereas steps 902-906 can be performed online or offline. In some embodiments, some and/or all steps of process 900 are performed by decomposition module 614.

Process 900 is shown to include identify major equipment types (step 902). In some embodiments, major equipment is defined as equipment that produces resources in $K^+$. It should be noted that, in step 902, other types of major equipment may be excluded, but all other auxiliary equipment (i.e., equipment that does not produce resources in $K^+$) are retained. The major equipment types can be determined/identified in step 902 by analyzing information describing all building equipment and identifying what equipment produces resources in $K^+$. In some embodiments, step 902 is performed by decomposition module 614.

Process 900 is shown to include solving equipment selection subproblems for each major equipment type (step 904). Based on the major equipment types identified in step 902, step 904 can include solving the subproblem defined in Eqs. 27-31 which may assume that time-invariant representative values can be chosen for resource costs $\rho_k$ and equipment models $\zeta_{jkn}$. In some embodiments, step 904 is performed by decomposition module 614.

Process 900 is shown to include selecting aggregate central plant representations (step 906). The aggregate central representations can be used to define a centralized subproblem and thereby a waterside subproblem further in process 900. Step 906 may include defining the following sets for constructing the aggregate representations:

$$K^+ := \{k \in K : \phi_{kt} > 0 \text{ or } \Gamma_{ikt} > 0 \text{ for some } t \in T \text{ or } i \in I\},$$

$$K^- := \{k \in K : \Pi_k > 0\}$$

Based on the above sets, representative resources $k^* \in K^+$ can be chosen and solved with $\phi_{k^*}$ varying from zero to a maximum total capacity for the type of unit. Based on said values, a single operating curve $\bar{\zeta}_{kn}$ can be constructed to represent overall behavior of a given type of equipment, thereby defining the aggregate representations $\bar{\zeta}$. In some embodiments, step 906 is performed by decomposition module 614.

Process 900 is shown to include solving a centralized subproblem based on the aggregate central plant representations (step 908). The centralized subproblem solved in step 908 may be based on the aggregate representations $\bar{\zeta}$ of the central plant selected in step 906. Step 906 may include optimizing a full airside model with approximate aggregate waterside models. The centralized subproblem solved in step 908 may be a modified version modified version of the original formulation that removes switching between the constraints defined in Eqs. 4-6. Further, the centralized subproblem may fix the variables $U_{jt}$ to 1 and can use the approximate curves $\bar{\zeta}$ (with the appropriately adjusted sets J, M, and N). In some embodiments, step 908 is performed by decomposition module 614.

Process 900 is shown to include solving a waterside subproblem using a fixed primary demand of resources from the centralized subproblem (step 910). The waterside subproblem solved in step 910 may be a primal waterside subproblem in which the full waterside model is optimized assuming an airside demand is fixed to an optimal value from the centralized subproblem solved in step 908. Solving the waterside subproblem in step 910 may be similar to and/or the same as how the waterside subproblem of the Lagrangian decomposition is solved as described with reference to process 800 of FIG. 8. In some embodiments, step 910 is performed by decomposition module 614.

Process 900 is shown to include a determination of whether to continue process 900 (step 912). In some embodiments, step 912 is similar to and/or the same as step 820 of process 800. Specifically, process 900 may be required to end after some termination condition is fulfilled. For example, process 900 can be performed for a predefined amount of time or for a predefined number of iterations. If the termination condition is not met (step 912, "YES"), process 900 can repeat beginning at step 908. If the termination condition is met (step 912, "NO"), process 900 can proceed to step 914. In some embodiments, step 912 is performed by decomposition module 614.

Process 900 is shown to include advancing to a next time step (step 914). In some embodiments, step 914 is similar to and/or the same as step 816 of process 800. Specifically, step 914 may include advancing from a current time step t to the next time step t+1. In some embodiments, step 914 is performed by decomposition module 614.

Process 900 is shown to include updating the aggregate central plant representations (step 916). Specifically, step 916 can include updating the approximate curves as appropriate for the the next time step to account for possibly time-varying equipment models. After step 916, process 900 can repeat starting at step 908 such that the hierarchical decomposition is effectively repeated for the next time step. In some embodiments, step 916 is performed by decomposition module 614.

Process 900 is shown to include ending the decomposition process (step 918). If step 918 is performed, the termination condition should be determined to be true in step 912, thereby indicating that process 900 should terminate. In this way, process 900 has an exit condition such that process 900 is not required to run ad infinitum. In some embodiments, step 918 is performed by decomposition module 614.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A controller for heating, ventilation, or air conditioning (HVAC) equipment, the controller comprising a processing circuit configured to:
perform a first optimization to generate a first set of control decisions at a plurality of time steps of a first prediction horizon for HVAC equipment comprising waterside HVAC equipment that consume one or more resources from utility providers to generate a heated or chilled fluid and airside HVAC equipment that receive the heated or chilled fluid from the waterside HVAC equipment and use the heated or chilled fluid to heat or cool a supply of airflow for a building;
perform a second optimization subject to a constraint to generate a second set of control decisions for the HVAC equipment using a full model of the waterside HVAC equipment and the airside HVAC equipment to generate the second set of control decisions at a plurality of time steps within a second prediction horizon, the second prediction horizon shorter than the first prediction horizon, wherein the constraint is based on a result of the first optimization and comprises at least one of (i) a fixed value for a variable in the second optimization, (ii) an upper or lower bound for the second optimization, or (iii) a predicted state of the HVAC equipment or a predicted state of the building at one or more of the plurality of time steps within the first prediction horizon resulting from performing the first optimization;
combine the first set of control decisions and the second set of control decisions to generate a combined set of control decisions for the HVAC equipment; and
operate the HVAC equipment in accordance with the combined set of control decisions.

2. The controller of claim 1, wherein:
the constraint is a first predicted airside demand resulting from the first optimization;
the second optimization comprises a primal waterside optimization that is performed subject to the constraint; and
the second set of control decisions are generated by performing the primal waterside optimization and override a portion of the first set of control decisions generated by solving the first optimization.

3. The controller of claim 2, wherein performing the first optimization comprises:
decomposing a combined optimization problem for the waterside HVAC equipment and the airside HVAC equipment into a waterside dual subproblem for the waterside HVAC equipment and an airside dual subproblem for the airside HVAC equipment; and
solving both the waterside dual subproblem and the airside dual subproblem independently, wherein the first predicted airside demand results from solving the airside dual subproblem and the portion of the first set of control decisions results from solving the waterside dual subproblem.

4. The controller of claim 3, the processing circuit further configured to:
determine an initial estimate of a multiplier for resource supply to the airside HVAC equipment, wherein the airside dual subproblem and the waterside dual subproblem are solved with respect to the initial estimate; and
update the initial estimate of the multiplier based on a difference between the first predicted airside demand resulting from solving the airside dual subproblem and a second predicted airside demand resulting from solving the waterside dual subproblem.

5. The controller of claim 1, wherein:
the constraint is a predicted airside demand resulting from the first optimization;
the second optimization comprises a primal waterside optimization performed subject to a second constraint on the predicted airside demand; and
the second set of control decisions are for the waterside HVAC equipment and override a portion of the first set of control decisions that apply to the waterside HVAC equipment.

6. The controller of claim 5, wherein the first optimization comprises an integrated waterside and airside optimization that generates control decisions for both the waterside HVAC equipment and the airside HVAC equipment using a thermal model of the building and a simplified resource consumption model for the waterside HVAC equipment.

7. The controller of claim 6, the processing circuit further configured to generate the simplified resource consumption model for the waterside HVAC equipment by performing a plurality of waterside optimizations to determine amounts of resource consumption of the waterside HVAC equipment required to serve a plurality of different combinations of airside loads.

8. The controller of claim 1, wherein performing the first optimization comprises using a simplified surrogate model of the waterside HVAC equipment and the airside HVAC equipment to generate the first set of control decisions at the plurality of time steps within the first prediction horizon and to predict the state of the HVAC equipment or the state of the building at the one or more of the plurality of time steps within the first prediction horizon, wherein the simplified surrogate model comprises one or more simplifications of the full model.

9. The controller of claim 8, wherein the one or more simplifications comprising at least one of:
removing at least one constraint of the full model;
increasing a length of the plurality of time steps within the first prediction horizon;
combining a plurality of zones of the building into a single aggregate zone; or
removing at least one variable of the full model.

10. A method for operating heating, ventilation, or air conditioning (HVAC) equipment, the method comprising:
performing a first optimization to generate a first set of control decisions at a plurality of time steps for HVAC equipment comprising waterside HVAC equipment that consume one or more resources from utility providers to generate a heated or chilled fluid and airside HVAC equipment that receive the heated or chilled fluid from the waterside HVAC equipment and use the heated or chilled fluid to heat or cool a supply of airflow for a building;
performing a second optimization subject to a constraint to generate a second set of control decisions for the HVAC equipment, wherein:
the constraint is based on a result of the first optimization and comprises at least one of (i) a fixed value for a variable in the second optimization, (ii) an upper or lower bound for the second optimization, or (iii) a predicted state at one or more of the plurality of time steps;

the constraint comprises a predicted airside demand resulting from the first optimization;

the second optimization comprises a primal waterside optimization performed subject to a second constraint on the predicted airside demand; and the second set of control decisions are for the waterside HVAC equipment and override a portion of the first set of control decisions that apply to the waterside HVAC equipment;

combining the first set of control decisions and the second set of control decisions to generate a combined set of control decisions for the HVAC equipment; and operating the HVAC equipment in accordance with the combined set of control decisions.

11. The method of claim 10, wherein:

the constraint is a first predicted airside demand resulting from solving the first optimization;

the second optimization comprises a primal waterside optimization that is performed subject to the constraint; and the second set of control decisions are generated by performing the primal waterside optimization and override a portion of the first set of control decisions generated by solving the first optimization.

12. The method of claim 11, wherein performing the first optimization comprises:

decomposing a combined optimization problem for the waterside HVAC equipment and the airside HVAC equipment into a waterside dual subproblem for the waterside HVAC equipment and an airside dual subproblem for the airside HVAC equipment; and solving both the waterside dual subproblem and the airside dual subproblem independently, wherein the first predicted airside demand results from solving the airside dual subproblem and the portion of the first set of control decisions results from solving the waterside dual subproblem.

13. The method of claim 12, further comprising:

determining an initial estimate of a multiplier for resource supply to the airside HVAC equipment, wherein the airside dual subproblem and the waterside dual subproblem are solved with respect to the initial estimate; and updating the initial estimate of the multiplier based on a difference between the first predicted airside demand resulting from solving the airside dual subproblem and a second predicted airside demand resulting from solving the waterside dual subproblem.

14. The method of claim 11, wherein the first optimization comprises an integrated waterside and airside optimization that generates control decisions for both the waterside HVAC equipment and the airside HVAC equipment using a thermal model of the building and a simplified resource consumption model for the waterside HVAC equipment.

15. The method of claim 14, further comprising generating the simplified resource consumption model for the waterside HVAC equipment by performing a plurality of waterside optimizations to determine amounts of resource consumption of the waterside HVAC equipment required to serve a plurality of different combinations of airside loads.

16. The method of claim 10, wherein:

the constraint is based on a predicted state of the HVAC equipment or a predicted state of the building at one or more of the plurality of time steps within a first prediction horizon resulting from performing the first optimization;

the second optimization comprises using a full model of the waterside HVAC equipment and the airside HVAC equipment to generate the second set of control decisions at a plurality of time steps within a second prediction horizon, the second prediction horizon shorter than the first prediction horizon, the second optimization performed subject to the constraint.

17. The method of claim 16, wherein performing the first optimization comprises using a simplified surrogate model of the waterside HVAC equipment and the airside HVAC equipment to generate the first set of control decisions at the plurality of time steps within the first prediction horizon and to predict the state of the HVAC equipment or the state of the building at the one or more of the plurality of time steps within the first prediction horizon, wherein the simplified surrogate model comprises one or more simplifications of the full model.

18. The method of claim 16, wherein performing the first optimization comprises using a simplified surrogate model, wherein the simplified surrogate model comprises one or more simplifications of the full model, the one or more simplifications comprising at least one of:

removing at least one constraint of the full model;

increasing a length of the plurality of time steps within the first prediction horizon;

combining a plurality of zones of the building into a single aggregate zone; or removing at least one variable of the full model.

* * * * *